United States Patent
Miller et al.

(10) Patent No.: US 8,763,258 B2
(45) Date of Patent: Jul. 1, 2014

(54) PORTABLE BAND SAW

(75) Inventors: Philip T. Miller, Phoenix, MD (US);
David R. Beers, Dallastown, PA (US);
Spencer G. Maid, Harland, WI (US);
Paul S. White, Towson, MD (US);
Dennis A. Bush, Dillsburg, PA (US);
William F. Gallagher, Stewartstown, PA (US); Thomas R. Kaye, Jr., Balitmore, MD (US); Paul J. Korick, York, PA (US); Timothy J. Seeley, Rosedale, MD (US); Dennis J. Gulbin, Jr., Baltimore, MD (US); Jason R. Melvin, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 1246 days.

(21) Appl. No.: 12/362,766

(22) Filed: Jan. 30, 2009

(65) Prior Publication Data
US 2009/0265943 A1 Oct. 29, 2009

Related U.S. Application Data

(60) Provisional application No. 61/025,217, filed on Jan. 31, 2008.

(51) Int. Cl.
*B23D 53/12* (2006.01)
(52) U.S. Cl.
USPC .......................................... 30/380; 83/522.15
(58) Field of Classification Search
USPC ................. 30/380–387; 83/520, 521, 522.15; 362/259, 362, 368, 372, 374
See application file for complete search history.

(56) References Cited

U.S. PATENT DOCUMENTS

| | | | |
|---|---|---|---|
| 583,105 A | 5/1897 | Wheeler |
| 588,242 A | 8/1897 | Rexroth |
| 642,830 A | 2/1900 | Zeinwoldt |
| 1,394,174 A | 10/1921 | Ireland et al. |
| 1,731,872 A | 10/1929 | Schons |
| 1,890,509 A | 12/1932 | Hopkins |
| 1,902,114 A | 3/1933 | Beanblossom |
| 2,226,616 A | 12/1940 | Kraus |
| 2,302,424 A | 11/1942 | Delnostro |
| 2,384,364 A | 9/1945 | Boice et al. |
| 2,506,610 A | 5/1950 | Mueller |
| 2,588,288 A | 3/1952 | Pohanka |

(Continued)

FOREIGN PATENT DOCUMENTS

| | | |
|---|---|---|
| DE | 3634424 | 4/1988 |
| JP | 2001300819 | 10/2001 |
| JP | 2006212807 | 8/2006 |

*Primary Examiner* — Omar Flores Sanchez
(74) *Attorney, Agent, or Firm* — Michael Aronoff

(57) ABSTRACT

A portable band saw includes a serviceable/replaceable bumper system for allowing the band saw to be easily repaired if damaged from being dropped. An auxiliary handle is adjustably mounted to the band saw and is releasable from its position if subjected to a large force so as to avoid damage to the handle and tool housing. An adjustable guide shoe includes a toolless adjustment. The front and rear section of the band saw are disposed on opposite sides of a polymeric field case. Compression rods are used to isolate compression forces from the polymeric field case. An electric box assembly including a plastic component box is disposed between the field case and a front section of the band saw. A crash guard is mounted adjacent to the field case and includes a sight guide along an edge thereof and a rear blade guard formed integrally therewith.

9 Claims, 21 Drawing Sheets

(56) References Cited

U.S. PATENT DOCUMENTS

| | | | |
|---|---|---|---|
| 2,596,081 | A | 5/1952 | Sacrey |
| 2,696,228 | A | 12/1954 | Bowen |
| 2,778,043 | A | 1/1957 | Arf |
| 3,104,688 | A | 9/1963 | Bretthauer |
| 3,128,661 | A | 4/1964 | Diehl et al. |
| 3,178,816 | A | 4/1965 | Schmid |
| 3,256,763 | A | 6/1966 | Haas et al. |
| 3,336,703 | A | 8/1967 | Multer |
| 3,545,786 | A | 12/1970 | Yoder |
| 3,658,102 | A | 4/1972 | Joosten |
| 3,829,970 | A | 8/1974 | Anderson |
| 3,851,553 | A | 12/1974 | Gale et al. |
| 4,001,937 | A | 1/1977 | Stelljes et al. |
| 4,160,320 | A | 7/1979 | Wikoff |
| 4,217,625 | A | 8/1980 | Klein |
| 4,257,297 | A | 3/1981 | Nidbella |
| 4,266,457 | A | 5/1981 | Balch et al. |
| 4,413,414 | A | 11/1983 | Strzalka |
| 4,428,266 | A | 1/1984 | Keddie |
| 4,450,627 | A | 5/1984 | Morimoto et al. |
| 4,481,436 | A | 11/1984 | Renaud et al. |
| 4,517,700 | A | 5/1985 | Pinto |
| 4,531,286 | A | 7/1985 | Vito et al. |
| 4,773,503 | A | 9/1988 | Purkapile |
| 4,841,187 | A | 6/1989 | Hauke et al. |
| 4,922,744 | A | 5/1990 | Stursberg et al. |
| 4,953,295 | A | 9/1990 | Barradas et al. |
| 5,154,435 | A | 10/1992 | Chiu et al. |
| 5,172,522 | A | 12/1992 | Jares |
| 5,296,768 | A | 3/1994 | Burger et al. |
| 5,381,595 | A | 1/1995 | Keith, Jr. et al. |
| 5,446,635 | A * | 8/1995 | Jehn ............................... 362/259 |
| 5,503,430 | A | 4/1996 | Miki et al. |
| 5,520,474 | A | 5/1996 | Liu et al. |
| 5,546,840 | A | 8/1996 | Supe-Dienes et al. |
| 5,687,483 | A | 11/1997 | Neubert et al. |
| 5,765,857 | A | 6/1998 | Hsiao et al. |
| RE36,336 | E | 10/1999 | Didier |
| 5,996,460 | A | 12/1999 | Waite |
| 6,107,713 | A | 8/2000 | Hulsmann et al. |
| 6,145,995 | A | 11/2000 | Hung et al. |
| 6,249,068 | B1 | 6/2001 | Knopp et al. |
| 6,266,850 | B1 | 7/2001 | Williams et al. |
| 6,317,930 | B1 | 11/2001 | Hung et al. |
| 6,345,836 | B1 | 2/2002 | Wu et al. |
| 6,397,717 | B1 | 6/2002 | Waite |
| 6,442,848 | B1 | 9/2002 | Dean |
| 6,454,427 | B1 | 9/2002 | Chen et al. |
| 6,459,183 | B1 | 10/2002 | Tasch et al. |
| 6,494,590 | B1 | 12/2002 | Paganini et al. |
| 6,499,172 | B1 | 12/2002 | McCracken |
| 6,578,459 | B2 | 6/2003 | Waite |
| 6,731,503 | B2 | 5/2004 | Privett et al. |
| 6,736,037 | B2 | 5/2004 | Dean |
| 6,829,830 | B2 | 12/2004 | O'Banion |
| 6,869,086 | B2 | 3/2005 | Sadow |
| 6,918,331 | B2 | 7/2005 | Okouchi et al. |
| 6,920,047 | B2 | 7/2005 | Privett et al. |
| 7,000,321 | B1 * | 2/2006 | Rodgers ............................ 30/29 |
| 7,055,252 | B2 * | 6/2006 | Wu ................................. 33/286 |
| 7,063,441 | B2 | 6/2006 | Kramer et al. |
| 7,082,689 | B2 | 8/2006 | Beville et al. |
| D530,580 | S | 10/2006 | Hayakawa et al. |
| D545,656 | S | 7/2007 | Welsh |
| D546,153 | S | 7/2007 | Hayakawa et al. |
| 7,267,039 | B2 * | 9/2007 | Liao et al. ....................... 83/520 |
| 7,284,335 | B2 * | 10/2007 | Park et al. ....................... 33/286 |
| 7,520,062 | B2 * | 4/2009 | Munroe et al. ................. 33/286 |
| 7,556,401 | B2 * | 7/2009 | Smith et al. .................... 362/259 |
| 7,793,575 | B2 * | 9/2010 | Ushiwata et al. ............... 83/520 |
| 7,926,187 | B2 * | 4/2011 | Uehlein-Proctor et al. .... 30/380 |
| 2002/0054491 | A1 | 5/2002 | Casas |
| 2002/0105797 | A1 | 8/2002 | Navid et al. |
| 2003/0188440 | A1 | 10/2003 | Dean |
| 2004/0139835 | A1 | 7/2004 | Wright et al. |
| 2004/0158996 | A1 | 8/2004 | McIntosh |
| 2005/0099801 | A1 | 5/2005 | Zhang et al. |
| 2005/0103176 | A1 * | 5/2005 | Zhang et al. .................... 83/520 |
| 2005/0188550 | A1 | 9/2005 | Uehlein-Proctor et al. |
| 2006/0104053 | A1 | 5/2006 | Etter et al. |
| 2006/0158057 | A1 | 7/2006 | Huck et al. |
| 2007/0000137 | A1 | 1/2007 | Beville et al. |
| 2007/0068011 | A1 | 3/2007 | Shibata et al. |
| 2009/0158907 | A1 * | 6/2009 | Chiang et al. ................... 83/520 |
| 2011/0005537 | A1 * | 1/2011 | Hsu ................................. 132/73.5 |
| 2011/0259167 | A1 * | 10/2011 | Tung ............................ 83/522.15 |

* cited by examiner

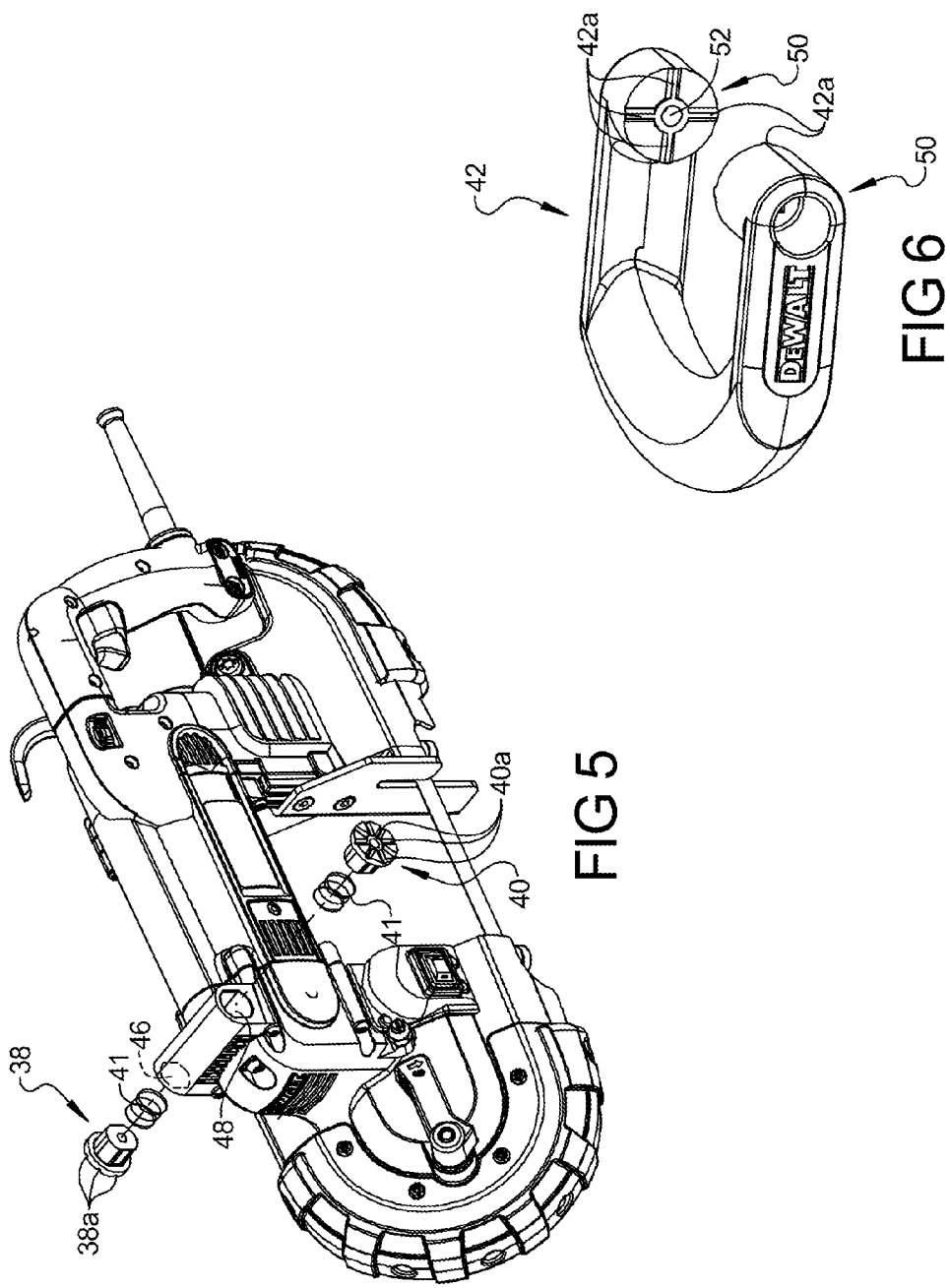

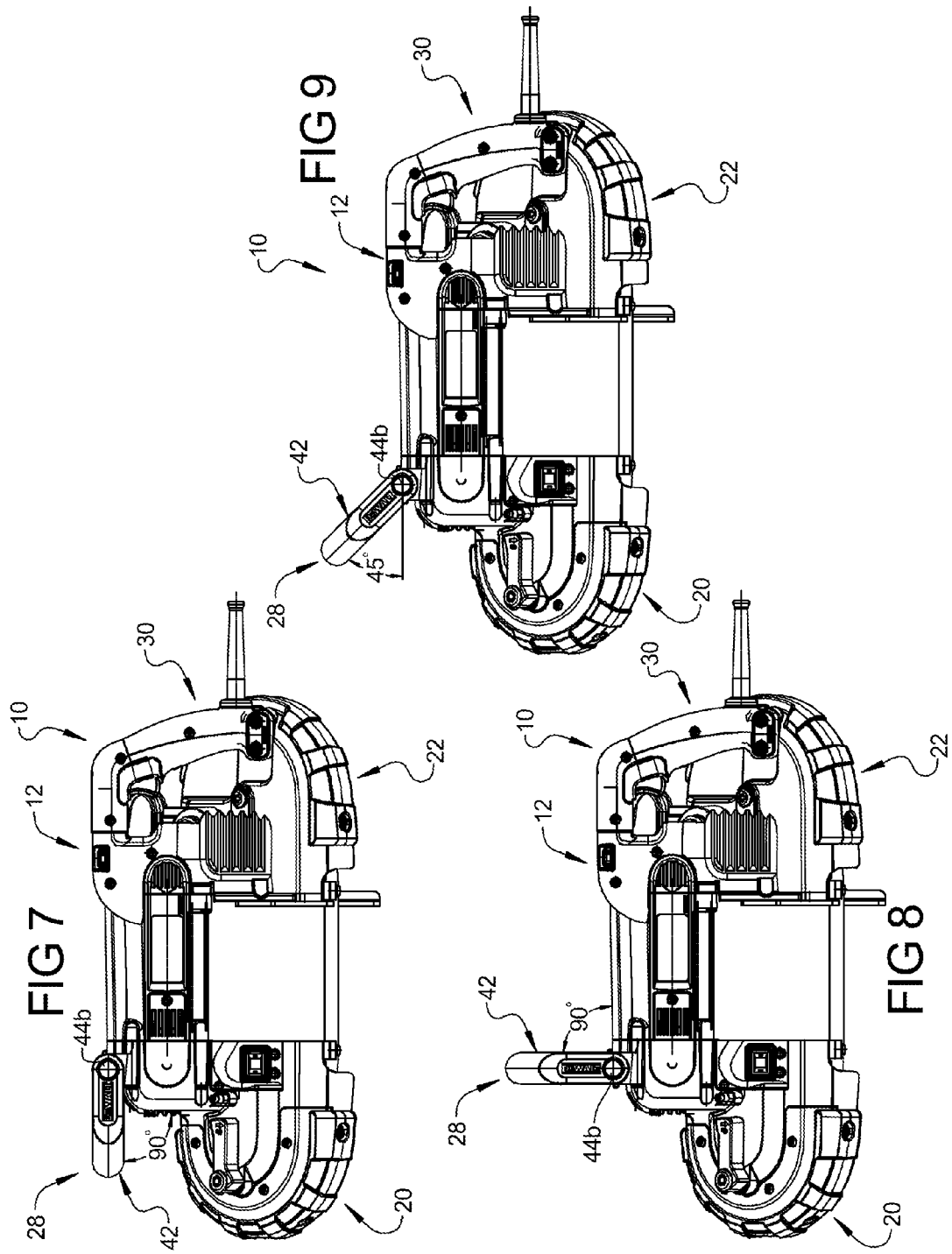

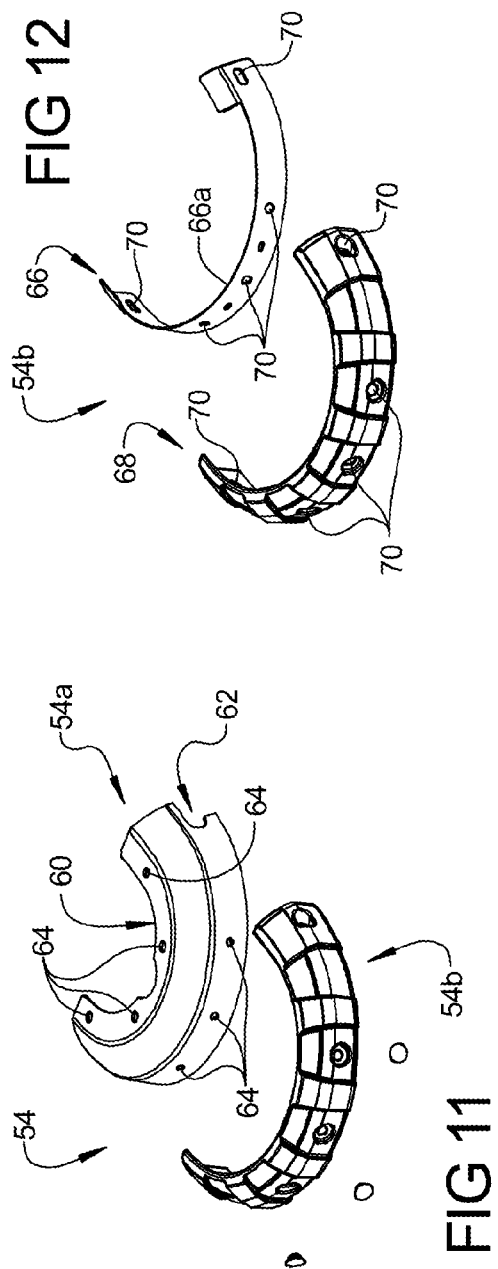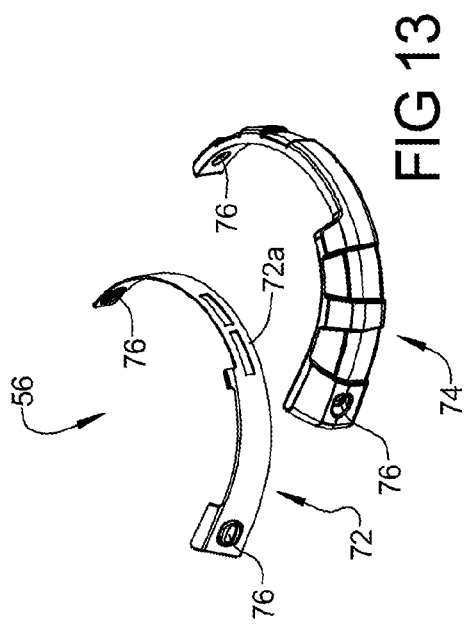

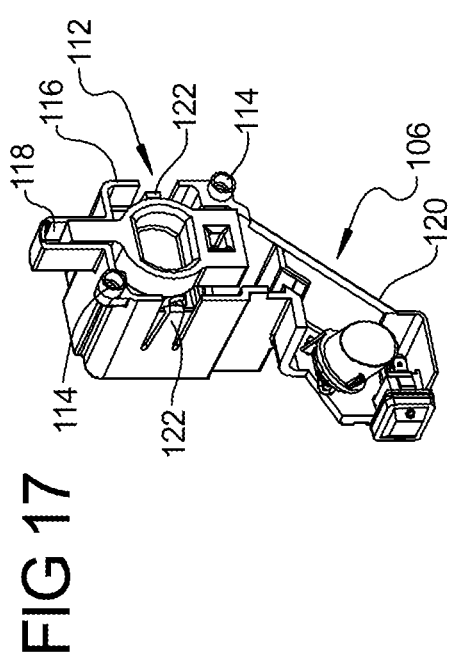
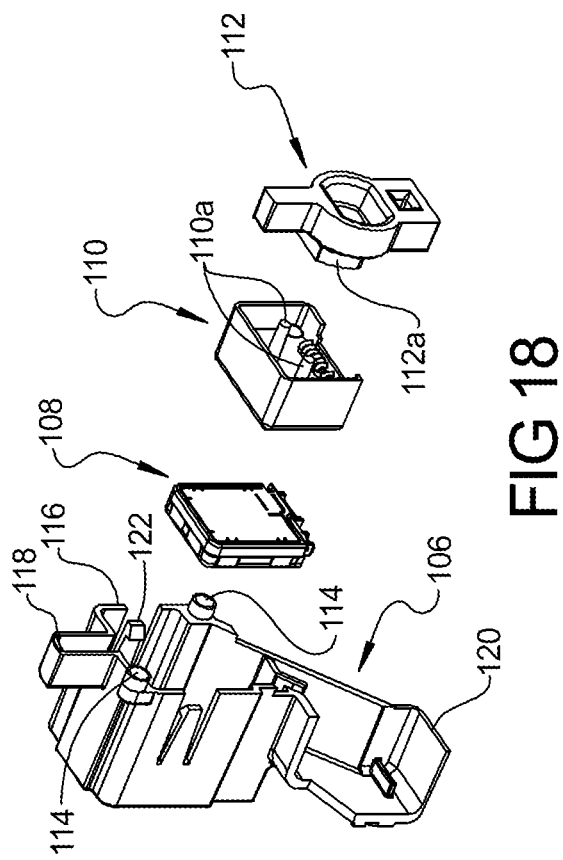

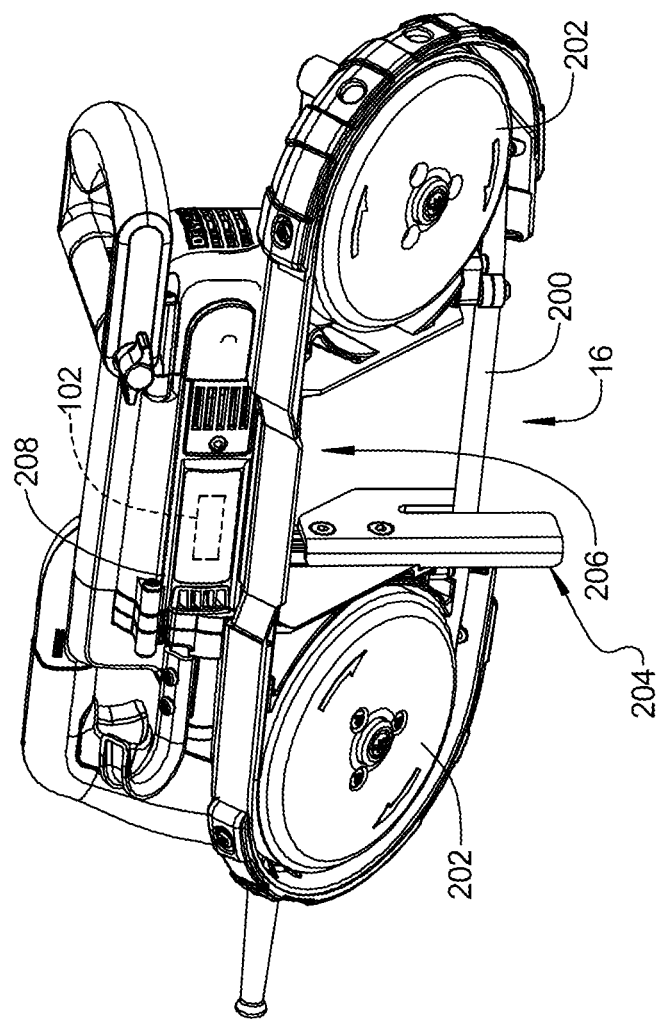

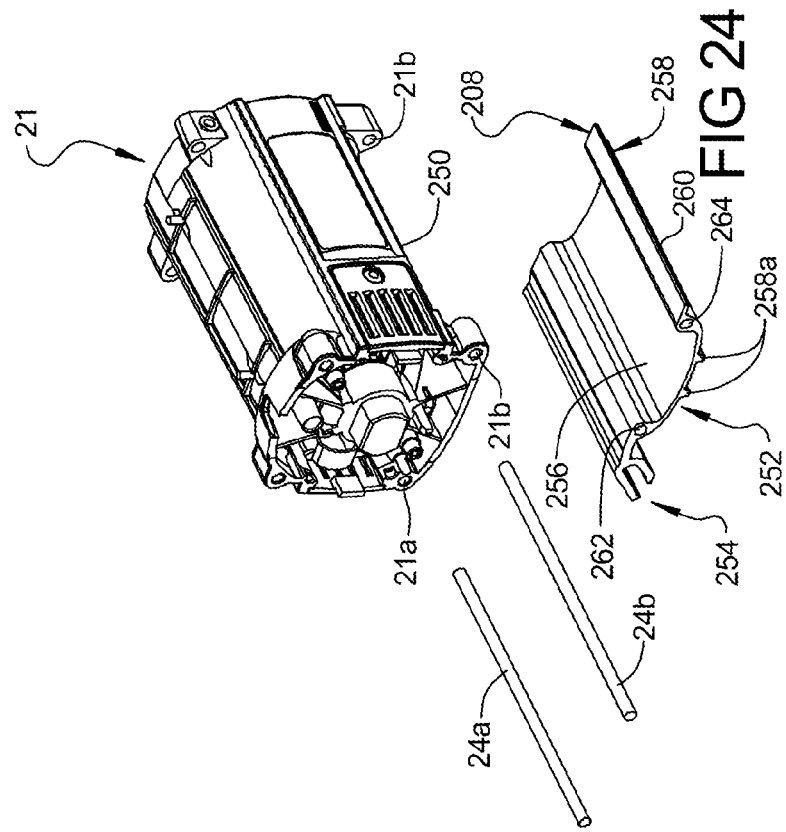
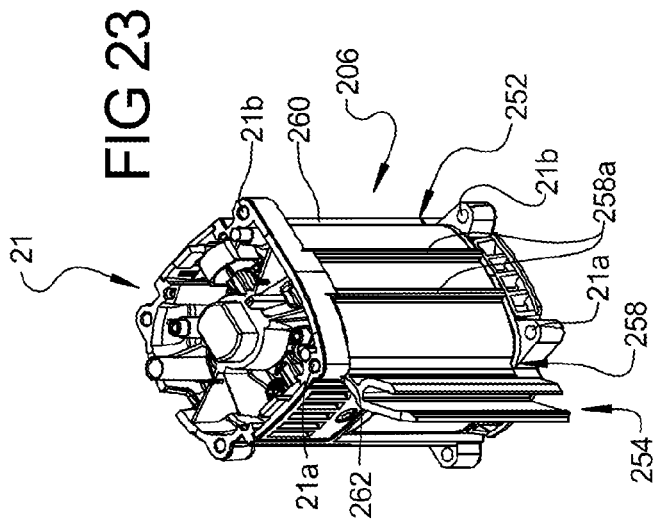

PORTABLE BAND SAW

CROSS-REFERENCE TO RELATED APPLICATIONS

This application claims the benefit of U.S. Provisional Application No. 61/025,217, filed on Jan. 31, 2008.

FIELD

The present disclosure relates to various improvements to a portable band saw.

BACKGROUND

This section provides background information related to the present disclosure which is not necessarily prior art.

Many tradespersons, such as pipe fitters, steam fitters and electricians, routinely cut metal workpieces such as pipes, tubes and conduit with portable hand-held power saws. In some applications, such as when the end of a pipe or conduit is to be threaded, it is highly desirable that the cut be perpendicular to the axis of the workpiece so that the maximum axial deviation or runout of the cut is less than about one-thirty second of an inch. When this degree of accuracy is needed, the tradesperson was typically forced to employ a free-standing cutoff saw or a portable hand-held band saw. Free-standing cutoff saws, however, are not typically practical due to issues with their cost and size, as well as the free-standing (i.e., non-portable) nature of the saw.

Although portable hand-held band saws provide the tradesperson with an efficient yet portable means for cutting work pieces, these tools can be improved by improving their maintenance and damage prevention, increasing their functionality, reducing their weight and improving the accuracy of a cut made by the band saw.

SUMMARY

This section provides a general summary of the disclosure, and is not a comprehensive disclosure of its full scope or all of its features.

A portable band saw includes a serviceable/replaceable bumper system for allowing the band saw to be easily repaired if damaged from being dropped. The bumper system includes a rigid shroud removably mounted to the band saw and an elastomeric bumper mounted to said rigid shroud.

An auxiliary handle is adjustably mounted to the band saw and is releasable from its position if subjected to a large force so as to avoid damage to the handle and tool housing. The front section of the band saw includes at least one bore receiving a spring biased insert having at least one of a detent and a protrusion for engaging the other of a detent and a protrusion on the handle. The spring biased insert allows the handle to disengage from the insert when subjected to a large force, such as by being dropped.

An adjustable guide shoe is provided that includes a toolless adjustment mechanism to allow the position of the guide shoe to be easily adjusted.

The front and rear section of the band saw are disposed on opposite sides of a polymeric field case. Compression rods are used to isolate compression forces from the polymeric field case.

An electric box assembly including a plastic component box is disposed between the field case and a front section of the band saw. The plastic component box can house a control module and a light power supply. One or more routing cavities can extend from the component box and provide a covering for a wire of a wire harness connected to said control module. A light emitting diode can be mounted to a routing cavity of the component box and can be aligned with the band saw blade to cast a shadow along the cut line.

A crash guard is mounted adjacent to the field case for protecting the filed case from damage. The crash guard can include a sight guide along an edge thereof and a rear blade guard formed integrally therewith for shielding the user from the return blade.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view of the portable band saw shown in FIG. 4 with the auxiliary handle shown removed to illustrate the spring biased inserts.

FIG. 6 is a perspective view of the auxiliary handle;

FIG. 7 is a side plan view of the portable band saw showing the auxiliary handle in a forward position;

FIG. 8 is a side plan view of the portable band saw showing the auxiliary handle in a upright position;

FIG. 9 is a side plan view of the portable band saw showing the auxiliary handle in an angled position;

FIG. 11 is an exploded perspective view of the front shroud and bumper assembly;

FIG. 12 is an exploded perspective view of the bumper assembly;

FIG. 13 is an exploded perspective view of the rear bumper assembly;

FIG. 17 is a perspective view of the electric box assembly of the present disclosure;

FIG. 18 is an exploded perspective view of the electric box assembly of the present disclosure;

FIG. 19 is perspective view of a rear of the portable band saw according to the principles of the present disclosure;

FIG. 23 is a perspective view of the crash guard mounted to the field case according to the principles of the present disclosure;

FIG. 24 is an exploded perspective view of the crash guard and field case according to the principles of the present disclosure;

Corresponding reference numerals indicate corresponding parts throughout the several views of the drawings.

DETAILED DESCRIPTION

Figure 1:
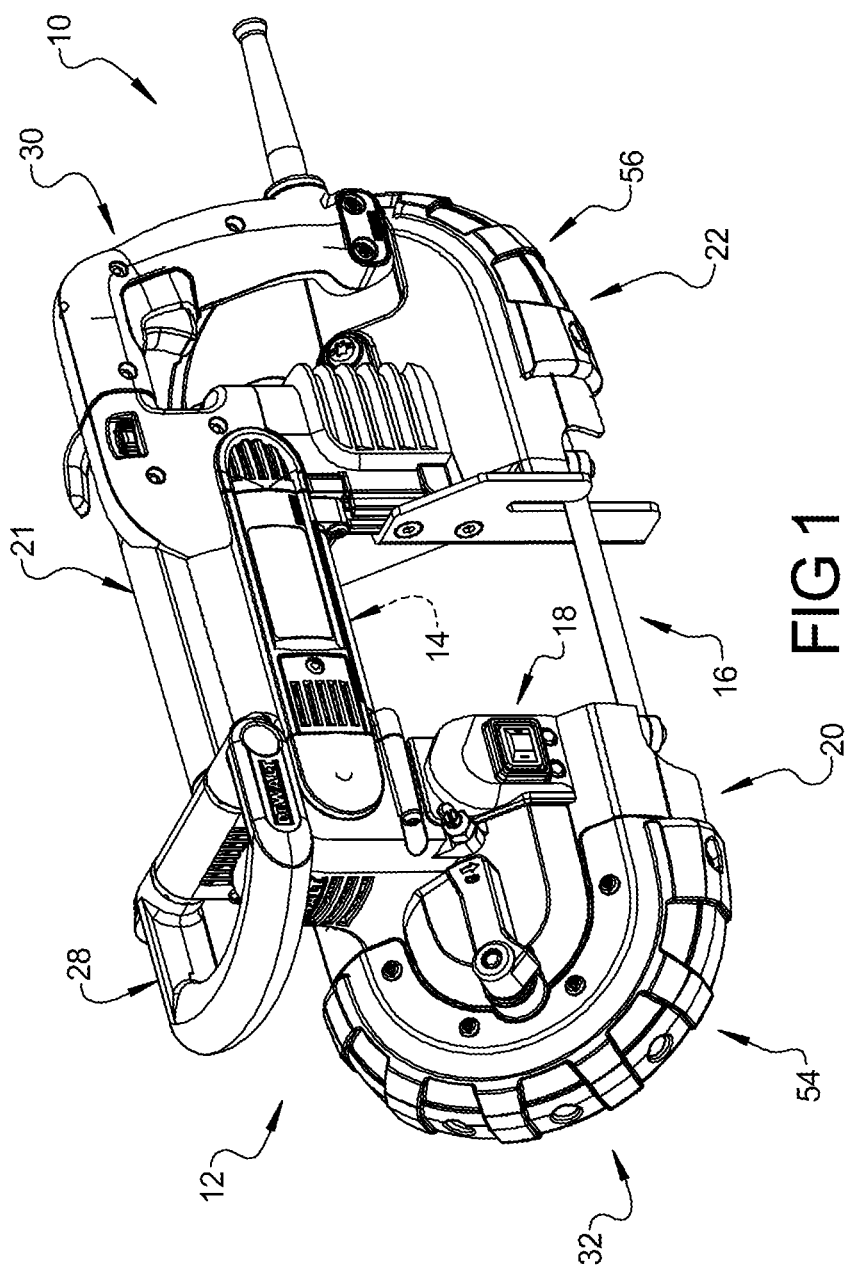
FIG. 1 is a perspective view of a portable band saw according to the principles of the present disclosure.

The following description is merely exemplary in nature and is not intended to limit the present disclosure, application, or uses. It should be understood that throughout the drawings, corresponding reference numerals indicate like or corresponding parts and features. Although the following description is related generally to portable band saws, it will be understood that the systems and features of the portable band saw, as described and claimed herein, can be used with any appropriate portable tool, such as an appropriate portable cutting device, for example, a circular saw, reciprocating saw, etc. Therefore, it will be understood that the following discussions are not intended to limit the scope of the appended claims.

With reference to FIG. 1, a portable band saw 10 is shown. The portable band saw 10 can be used to cut through various metal, metal alloy and/or polymeric work-pieces. The portable band saw 10 can include a housing 12, a power system 14, a saw blade system 16 and a lighting system 18. The housing 12 can enclose and/or support each of the power system 14, the saw blade system 16 and the lighting system 18. The power system 14 can power the saw blade system 16, such that the saw blade system 16 can cut through the desired structure. The lighting system 18 can illuminate a work surface associated with the cutting operation of the saw blade system 16 to facilitate the operation of the portable band saw 10.

Figure 2:
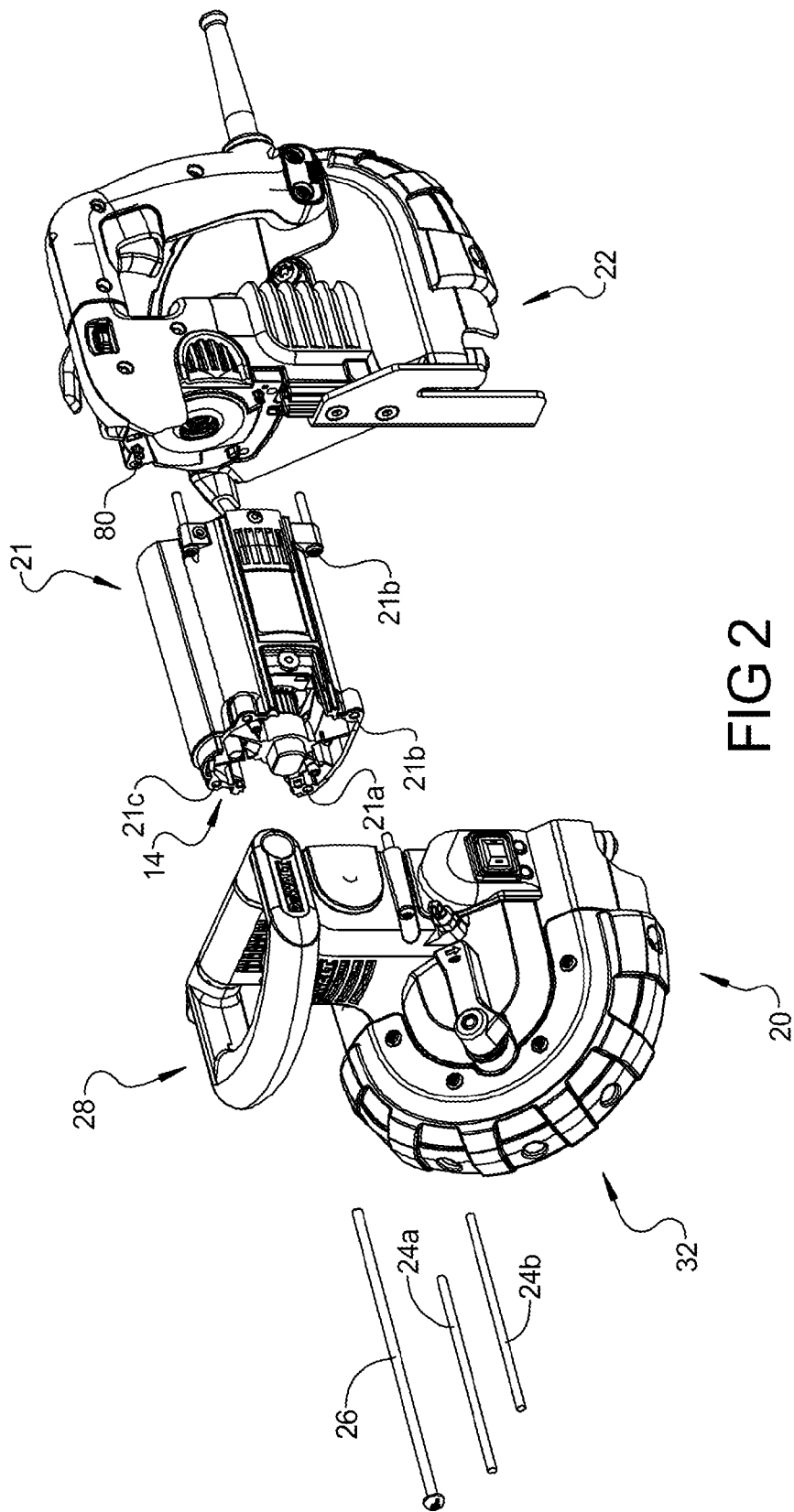
FIG. 2 is an exploded perspective view of the portable band saw shown in FIG. 1.

With reference to FIGS. 1 and 2, the housing 12 can include a first or front section 20 and a second or rear section 22, which can be joined together by a field case 21, one or more compression rods 24 and at least one tension screw/bolt 26. As the front section 20 and the rear section 22 of the housing 12 can be substantially similar to a housing associated with a commercially available Heavy-Duty Deep Cut Variable Speed Band Saw, model D28770, manufactured by DeWALT Industrial Tool Co. of Baltimore, Md., the front section 20 and the rear section 22 will not be discussed in great detail herein. Briefly, however, the front section 20 and rear section 22 can be composed of a metal or metal alloy material, and can comprise cast aluminum alloy or magnesium alloy, for example. The front section 20 can include a first or auxiliary handle 28, while the rear section 22 can include a second or trigger handle 30. Each of the front section 20 and the rear section 22 can include a bumper system 32.

The auxiliary handle 28 can provide additional stability for the user of the portable band saw 10, and can be indexed at multiple angles to enable the user to select a comfortable position for the operation of the portable band saw 10, which can improve the ease of use of the portable band saw 10. The auxiliary handle 28 can be coupled to the front section 20 of the housing 12 and can pivot or rotate relative to the housing 12. With additional reference to FIGS. 3-6, the auxiliary handle 28 can include a knob 34 (FIGS. 3 and 4), a washer 36 (FIG. 4), a first insert 38 (FIGS. 3 and 5), a second insert 40 (FIGS. 3 and 5), a handle body 42 (FIGS. 3, 4 and 6) and a carriage bolt 44 (FIGS. 3 and 4).

Figure 3:
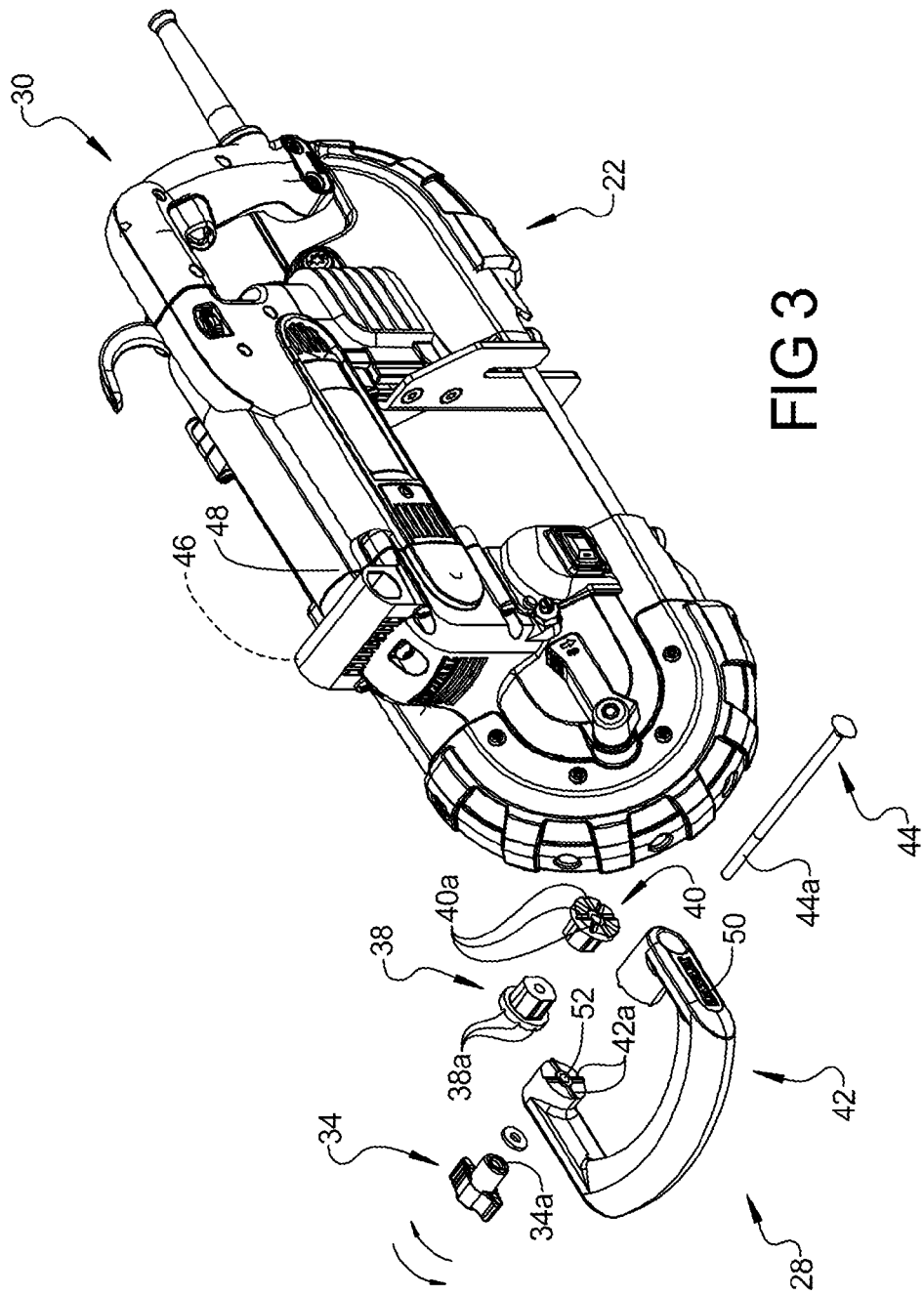
FIG. 3 is a perspective view of the portable band saw shown in FIG. 1 with the auxiliary handle shown in exploded view.
Figure 4:
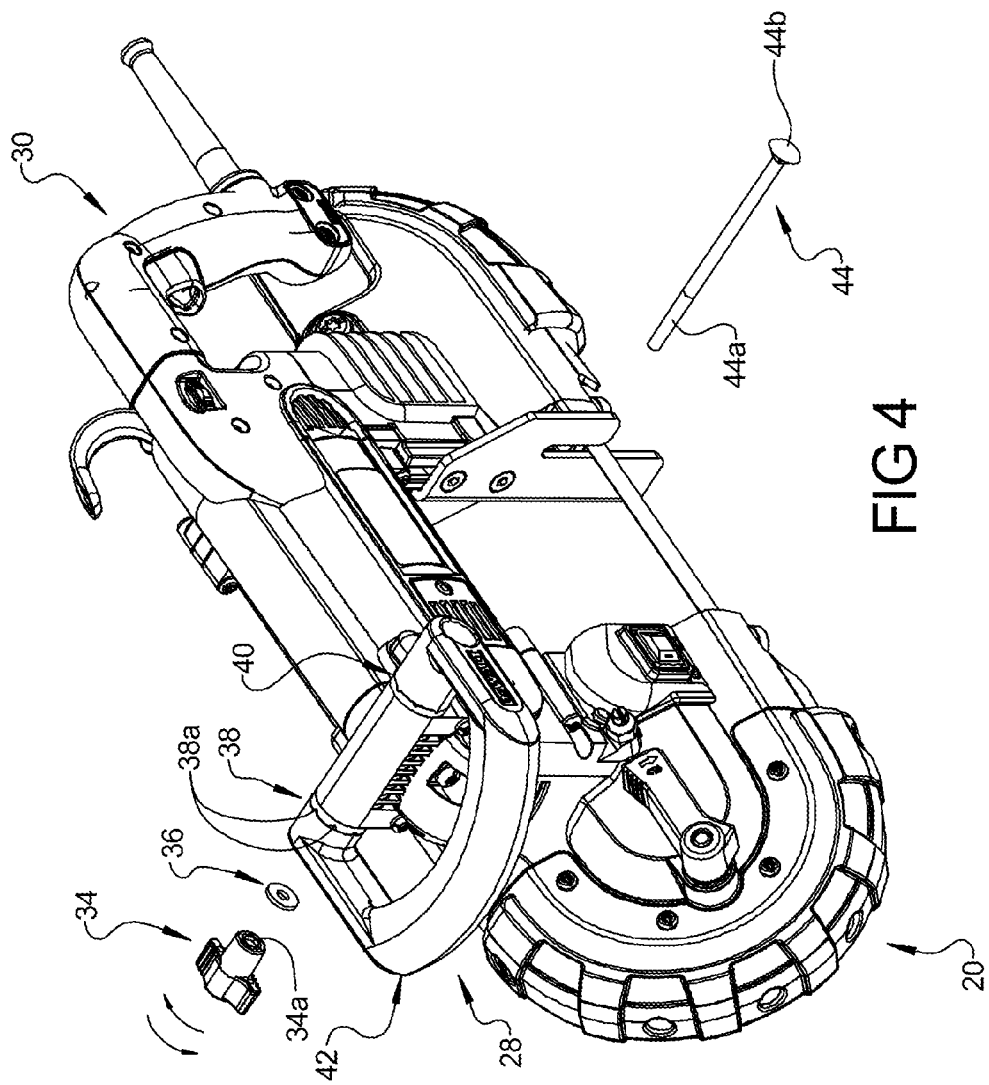
FIG. 4 is a perspective view of the portable band saw shown in FIG. 3 illustrating the assembly of the auxiliary handle.

With reference to FIGS. 3 and 4, the knob 34 can comprise any suitable graspable portion that can enable a user to easily rotate the knob 34 in a clockwise or counterclockwise direction while the user is holding the trigger handle 30. The knob 34 can be rotated relative to the housing 12 in a clockwise direction to secure the auxiliary handle 28 to the housing 12, and can be rotated in a counterclockwise direction to release the auxiliary handle 28 from the housing 12. In this regard, the knob 34 can include a bore 34a. The bore 34a can include threads, which can threadably engage mating threads 44a on the carriage bolt 44. Thus, the rotation of the knob 34 relative to the housing 12 can move the knob 34 along the threads 44a of the carriage bolt 44 to either tighten or lock the auxiliary handle 28 on the housing 12, or to release or loosen the auxiliary handle 28 relative to the housing 12, and thus, enable the auxiliary handle 28 to be pivoted or indexed relative to the housing 12.

With reference to FIG. 4, the washer 36 can be positioned between the knob 34 and the first insert 38 to distribute the tightening or compressive force from the knob 34 over a surface of the first insert 38. With reference to FIGS. 3 and 5, the first insert 38 can be coupled to a first bore 46 formed in the housing 12, and the second insert 40 can be coupled to a second bore 48 formed in the housing 12. It should be noted that although the first bore 46 and second bore 48 are identified as separate bores, the first bore 46 and second bore 48 could comprise a single bore formed through the housing 12. Typically, the first bore 46 can be formed opposite the second bore 48. The first insert 38 and second insert 40 can be coupled to the first bore 46 and second bore 48 through any suitable fastening technique, such as through the use of mechanical fasteners, a press-fit, a snap fit, welding and the like. Alternatively, the inserts 38, 40 can be provided with flats that orient the inserts within the 46, 48 and springs 41 (FIG. 5) can be disposed within the bores 46, 48 to bias the inserts toward the handle 42. Generally, the first insert 38 and second insert 40 can be composed of a resilient material, which can comprise a metal, metal alloy, polymer or combinations thereof. For example, the first insert 38 and second insert 40 can be composed of a metal or metal alloy and a polymer can be overmolded onto the metal or metal alloy, if desired. The first insert 38 and second insert 40 can each include multiple detents 38a, 40a, which can engage protrusions 42a formed on the handle body 42 (FIG. 3). The multiple detents 38a, 40a can enable the handle body 42 to be pivoted or indexed and secured to the housing 12 in a variety of positions. The springs 41 allow the inserts 38, 40 to be retracted out of engagement with the protrusions 42a of the handle body when the handle 42 is subjected to a large force, such as by being dropped. The ability of the handle to move when subject to a large force, protects the handle 42 and housing from being damaged if dropped.

With reference to FIGS. 3 and 6, the handle body 42 can be generally U-shaped, and can include the protrusions 42a. The protrusions 42a can be formed on opposite annular projections 50. The protrusions 42a can be sized to engage the detents 38a, 40a to enable the handle body 42 to be secured or coupled to the housing 12 in any desired position. Generally, with reference to FIGS. 7-9, the handle body 42 can be angled or indexed relative to the housing 12 in any position from about zero degrees (FIG. 7) to about ninety degrees (FIG. 8). For example, as shown in FIG. 9, the handle body 42 can be coupled to the housing 12 at about forty-five degrees. With reference back to FIG. 6, the annular projections 50 can include throughbores 52. The throughbores 52 can slideably engage the carriage bolt 44 to enable the handle body 42 to rotate or pivot about the carriage bolt 44 when the knob 34 is rotated accordingly, as shown in FIGS. 3 and 4.

With reference to FIGS. 3 and 4, the carriage bolt 44 can include the threads 44a and a head 44b. The threads 44a can engage the bore 34a of the knob 34 to enable the handle body 42 to be secured to or released from the housing 12. The head 44b can be sized such that the head 44b can apply a compressive force against one of the annular projections 50 of the handle body 42 when the auxiliary handle 28 is coupled to the housing 12, as shown best in FIGS. 7-9.

With reference to FIG. 1, the trigger handle 30 can be coupled to the rear portion 22 of the housing 12. As the trigger handle 30 can be substantially similar to a trigger handle associated with the commercially available Heavy-Duty Deep Cut Variable Speed Band Saw, model D28770, manufactured by DeWALT Industrial Tool Co. of Baltimore, Md., the trigger handle 30 will not be discussed in great detail herein. Briefly, however, the trigger handle 30 can enable the user to activate or deactivate the portable band saw 10, and can enable the user to guide the portable band saw 10 over a work-piece.

The housing 12 can include the bumper system 32, as shown in FIG. 1. The bumper system 32 can be coupled to the front section 20 and the rear section 22. The bumper system 32 can protect the portable band saw 10 from inadvertent falls from various heights. Further, the bumper system 32 can be easily replaceable such that the user of the portable band saw 10 can replace the bumper system 32 himself or herself at a job site, without requiring the user to take the portable band saw 10 to a service station. The bumper system 32 can generally be configured to absorb a significant shock load, which can thereby prevent damage to the housing 12. By preventing damage to the housing 12, the portable band saw 10 may remain operable after a significant fall. With additional reference to FIG. 10, the bumper system 32 can include a front bumper 54 that can be coupled to the front section 20, and a rear bumper 56 that can be coupled to the rear section 22.

Figure 10:
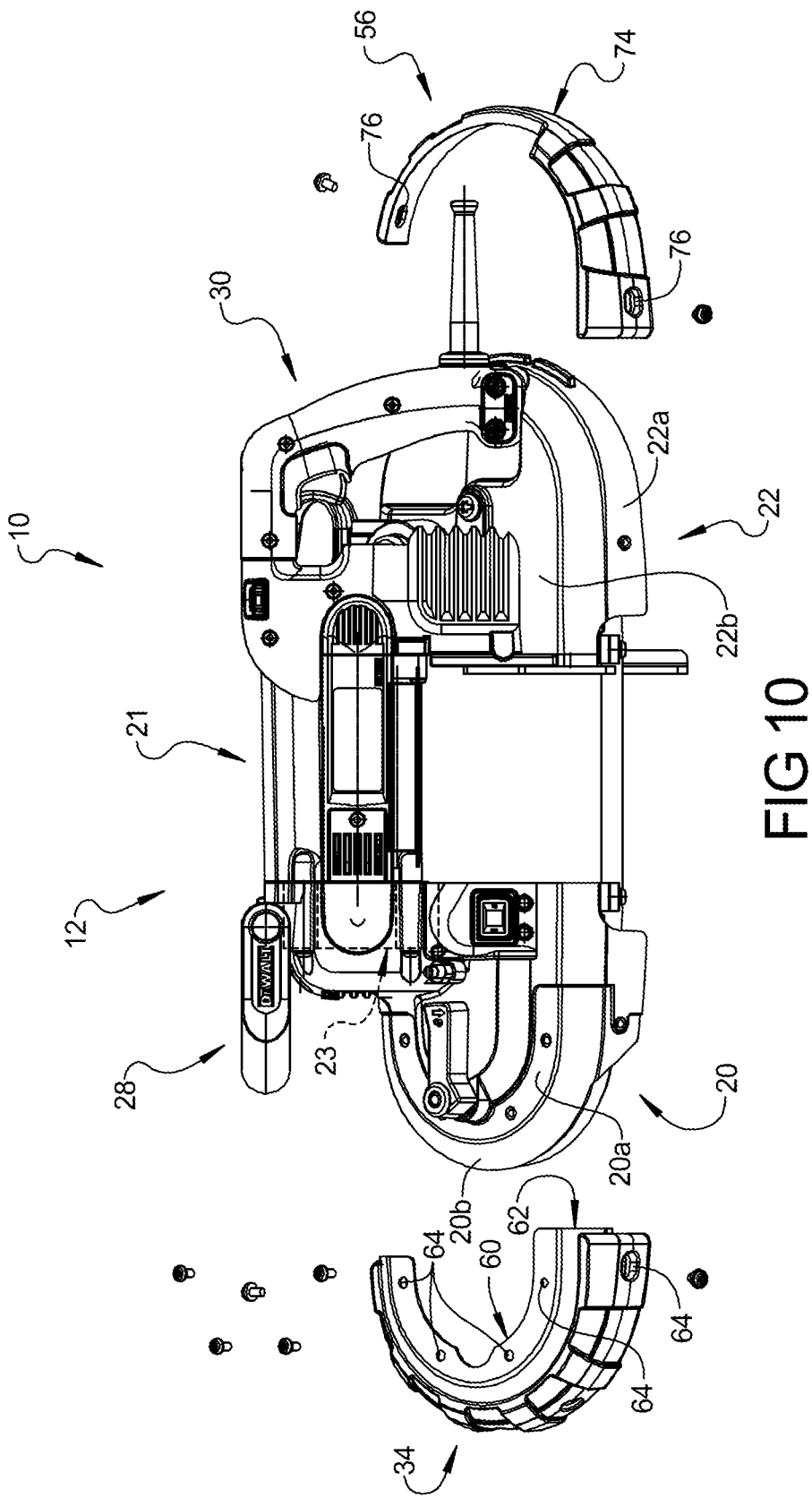
FIG. 10 is a perspective view of the portable band saw shown in FIG. 1 with the front and rear bumpers shown in exploded view.

With reference to FIGS. 10-12, the front bumper 54 can include a shroud 54a and a bumper 54b. The shroud 54a can be shaped to conform to a shape of the front section 20, and can include a first or top surface 60, a second or side surface 62 and one or more coupling features 64. The shroud 54a can be a monolithic member, but could also comprise one or more members to enable partial replacement of the front bumper 54, if desired. The shroud 54a can be composed of any suitable high strength material, such as a metal, metal alloy or polymer, and for example, steel. The shroud 54a can be coupled to the front section 20, via any suitable mechanical fastening technique, such as through a snap-fit or the use of mechanical fasteners, for example, rivets, bolts, screws, etc. Generally, as shown in FIG. 10, the top surface 60 can protect a top surface 20a of the front section 20, while the side surface 62 can protect an annular area 20b below the top surface 20a of the front section 20. The coupling features 64 can couple the top surface 60 of the shroud 54a to the top surface 20a of the front section 20, and can couple the side surface 62 to the annular area 20b. If mechanical fasteners are employed to couple the shroud 54a to the housing 12, then the coupling features 64 can comprise apertures, however, it will be understood that the coupling features 64 can comprise any desired feature to attach the shroud 54a to the housing 12, such as mating projections.

With continuing reference to FIGS. 10-12, the bumper 54b can be shaped to conform to a shape of the side surface 62 of the shroud 54a, and as best shown in FIG. 12, can include an insert 66, a polymeric member 68 and one or more coupling features 70. The bumper 54b can be a monolithic member, but could also comprise one or more members to enable partial replacement of the front bumper 54, if desired. The insert 66 can be composed of any suitable high strength material, for example, a metal, metal alloy or polymer, such as steel. The insert 66 can provide the bumper 54b with added rigidity. The insert 66 can be disposed adjacent to the side surface 62 of the shroud 54a when the bumper 54b is coupled to the shroud 54a.

The polymeric member 68 can be coupled adjacent to a surface 66a of the insert 66. The polymeric member 68 can be coupled to the insert 66 through any suitable technique, such as by overmolding the polymeric member 68 onto the insert 66, or by insert molding the insert 66 within the polymeric member 68. The polymeric member 68 can be composed of any suitable shock absorbing material, for example, rubber. The coupling features 70 can couple the bumper 54b to the shroud 54a. The bumper 54b can be coupled to the shroud 54a, via any suitable mechanical fastening technique, such as through a snap-fit or the use of mechanical fasteners, for example, rivets, bolts, screws, etc. If mechanical fasteners are employed to couple the bumper 54b to the housing 12, then the coupling features 70 can comprise apertures that extend through both the insert 66 and the polymeric member 68, however, it will be understood that the coupling features 70 can comprise any desired feature to attach the bumper 54b to the housing 12, such as mating projections.

With reference to FIG. 10, the rear bumper 56 can be coupled to the rear section 22 of the housing 12. Generally, the rear bumper 56 can be coupled to a side 22a of the rear section 22, to protect an annular area surrounding a top surface 22b of the rear section 22. The rear bumper 56 can be annular, however, the rear bumper 56 can be shaped as desired to conform to the shape of the rear section 22. The rear bumper 56 can be a monolithic member, but could also comprise one or more members to enable partial replacement of the rear bumper 56, if desired. With reference to FIG. 13, the rear bumper 56 can include an insert 72, a polymeric member 74 and one or more coupling features 76.

The insert 72 can be composed of any suitable high strength material, for example, a metal, metal alloy or polymer, such as steel. The insert 72 can provide the rear bumper 56 with added rigidity. The insert 72 can be disposed adjacent to the side 22a of the rear section 22 when the rear bumper 56 is coupled to the rear section 22.

The polymeric member 74 can be coupled adjacent to a surface 72a of the insert 72. The polymeric member 74 can be coupled to the insert 72 through any suitable technique, such as by overmolding the polymeric member 74 onto the insert 72, or by insert molding the insert 72 within the polymeric member 74. The polymeric member 74 can be composed of any suitable shock absorbing material, for example, rubber.

The coupling features 76 can couple the rear bumper 56 to the rear section 22. The rear bumper 56 can be coupled to the rear section 22, via any suitable mechanical fastening technique, such as through a snap-fit or the use of mechanical fasteners, for example, rivets, bolts, screws, etc. If mechanical fasteners are employed to couple the rear bumper 56 to the housing 12, then the coupling features 76 can comprise apertures that extend through both the insert 72 and the polymeric member 74, however, it will be understood that the coupling features 76 can comprise any desired feature to attach the rear bumper 56 to the housing 12, such as mating projections.

With reference to FIG. 2, the field case 21 can be coupled between the front section 20 and the rear section 22 of the housing 12. Generally, the field case 21 can be composed of a polymeric material, and can house at least a portion of the power system 14. The field case 21 can include a first bore 21a, a second bore 21b and a third bore 21c. The first bore 21a, the second bore 21b and the third bore 21c can extend at least partially through the field case 21. For example, the first bore 21a and the second bore 21b can be formed in the field case 21 such that a center area of the first bore 21a and second bore 21b can be devoid of the field case 21 to enable a portion of the saw blade system 16 to be coupled to the field case 21, via the compression rods 24, as will be discussed. The first bore 21a and the second bore 21b can be disposed at one side of the field case 21 and can be sized to receive the compression rods 24. The third bore 21c can pass through a side of the field case 21 opposite the first bore 21a and second bore 21b. The third bore 21c can be sized to receive the tension screw/bolt 26.

Figure 14:
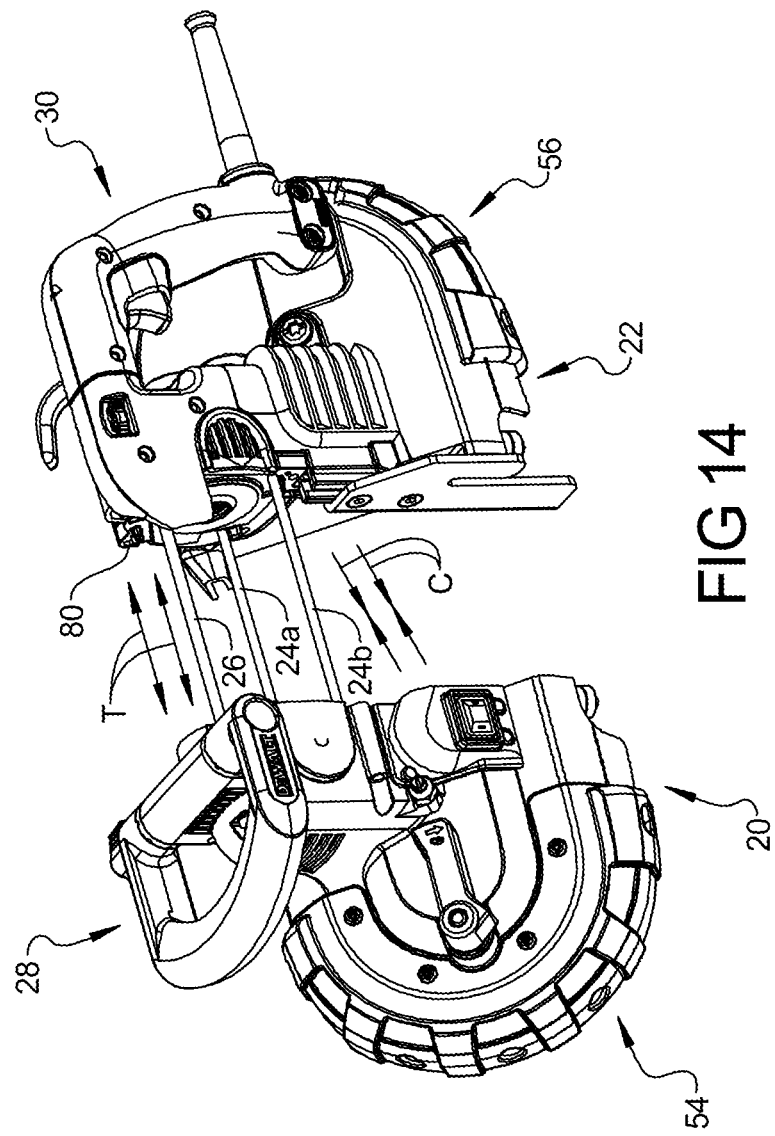
FIG. 14 is a perspective view of the portable band saw with the field case removed to illustrate the compression rods and tension bolts of the present disclosure.

With reference to FIGS. 2 and 14, the compression rods 24 can be coupled between the front section 20 and the rear section 22. A first compression rod 24a can be received in the first bore 21a, and a second compression rod 24b can be received in the second bore 21b of the field case 21, as shown in FIG. 14. The front section 20 and the rear section 22 can retain the compression rods 24 within the field case 21. The compression rods 24 can receive a compression load C that can be generally inherent in the portable band saw 10, and thus, the compression rods 24 can relieve the field case 21 from the compression load C, which can remove the compliant nature associated with the field case 21 being composed of a polymeric material. The compression rods 24 can also couple at least a portion of the saw blade system 16 to the field case 21, as will be discussed herein.

With continued reference to FIGS. 2 and 14, the tension screw/bolt 26 can be received through the third bore 21c of the field case 21, and can extend from the front section 20 to the rear section 22. The tension screw/bolt 26 can be threaded into a bore 80 defined in the rear section 22, which can serve to retain the tension screw/bolt 26 within the bore 21c. The tension screw/bolt 26 can receive a tension or tensile load T that can be generally inherent in the portable band saw 10, and thus, the tension screw/bolt 26 can relieve the field case 21 from the tensile load T, which can remove the compliant nature associated with having the field case 21 composed of a polymeric material.

Figure 15:
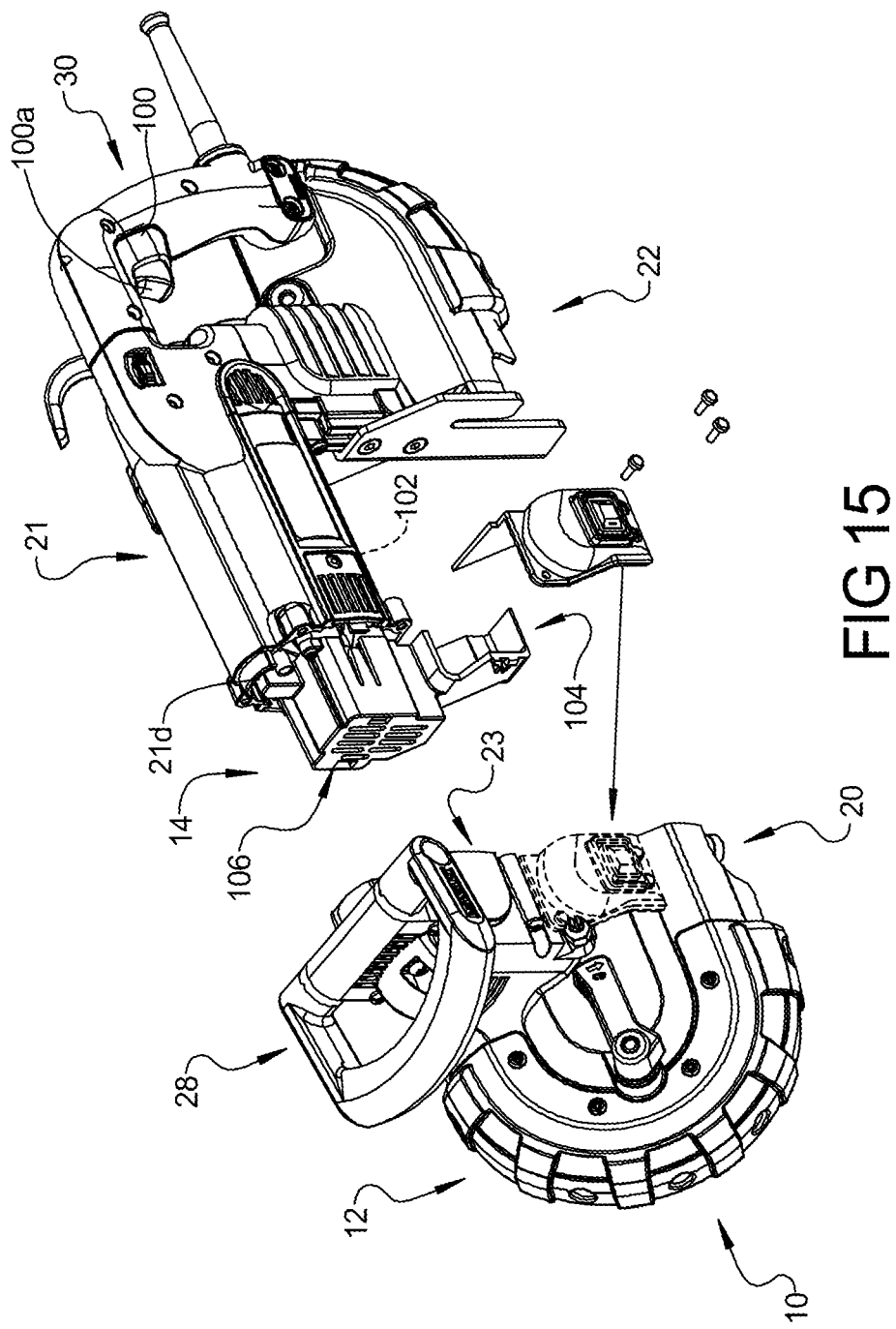
FIG. 15 is a partially exploded view of the portable band saw illustrating the electric box assembly of the present disclosure.

With reference to FIG. 15, the power system 14 can be encased by the housing 12. The power system 14 can drive the saw blade system 16 to cut the work-piece. The power system 14 can include a trigger 100, a motor 102 and a control system 104 via one or more wires 100b (shown in FIG. 16). As the trigger 100 and motor 102 can be substantially similar to a trigger and motor associated with a commercially available Heavy-Duty Deep Cut Variable Speed Band Saw, model D28770, manufactured by DeWALT Industrial Tool Co. of Baltimore, Md., the trigger 100 and motor 102 will not be discussed in great detail herein. Briefly, however, the trigger 100 can include an actuator 100a that can be in communication with the control system 104. The actuator 100a can protrude from the trigger handle 30 to enable a user to activate or deactivate the portable band saw 10. Based on the input from the user, the actuator 100a can transmit a signal to the control system 104 to activate the motor 102.

With reference to FIG. 15, the motor 102 can be a DC motor, such as a brushless DC motor. The motor 102 can be housed in the field case 21, and can be responsive to and in communication with the control system 104. The motor 102 can also be coupled to the saw blade system 16, via an output shaft, for example, to drive the saw blade system 16. As will be discussed, based on the input received by the actuator 100a, the control system 104 can provide the motor 102 with an appropriate current at an appropriate voltage phase angle to drive the saw blade system 16.

Figure 16:
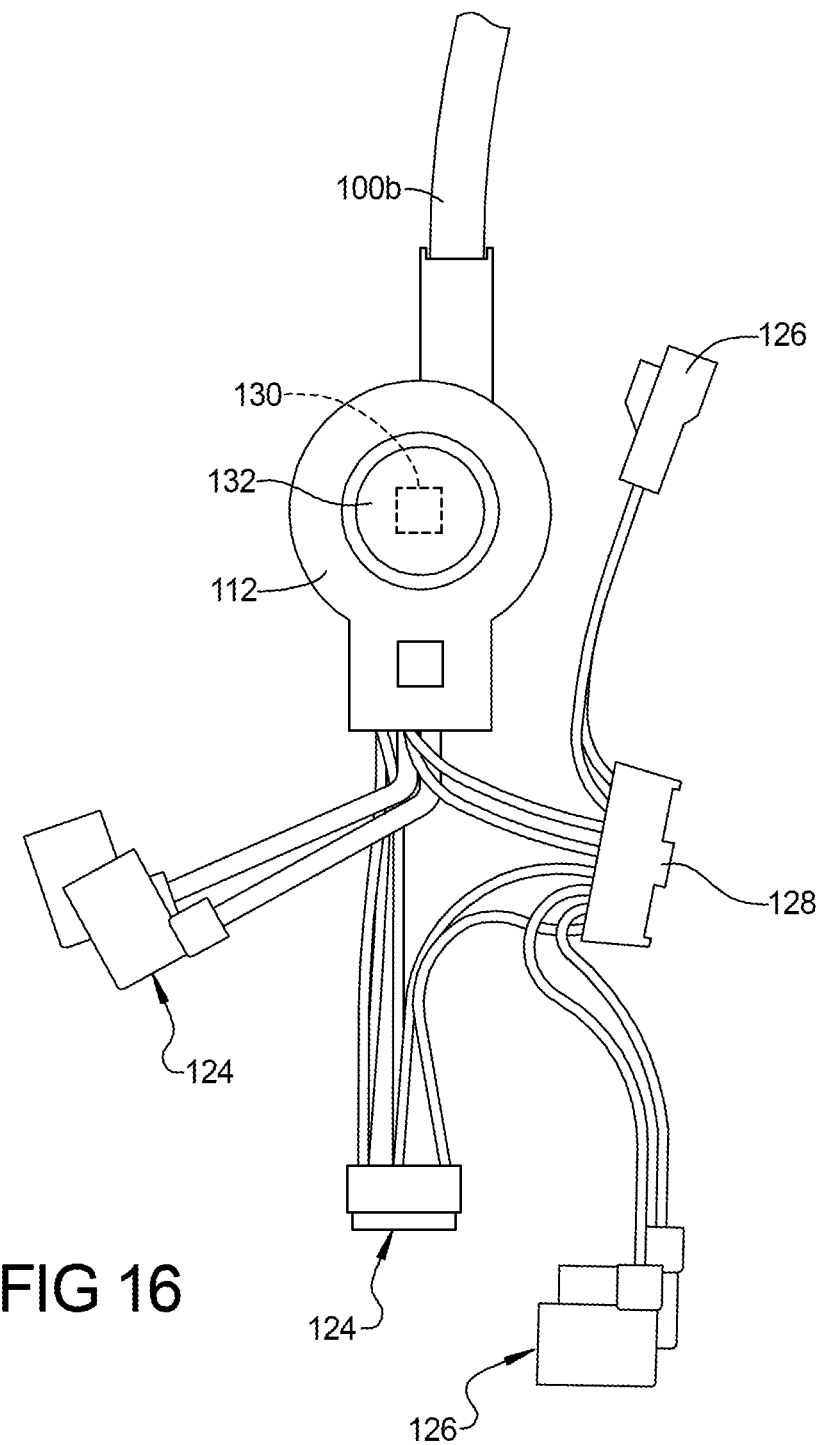
FIG. 16 is plan view of the wire harness according to the principles of the present disclosure.

The control system 104 can be coupled to a first end 21d of the field case 21, adjacent to the motor 102. The control system 104 can be operable to activate and deactivate the motor 102 based on the user input received from the trigger 100. With reference to FIGS. 15-18, the control system 104 can include a component box 106 (FIGS. 15, 17 and 18), a controller 108 (FIG. 18), a lighting power supply 110 (FIG. 18) and a wiring harness 112 (FIGS. 16-18).

With reference to FIGS. 17 and 18, the component box 106 can be composed of a polymeric material, which can serve to electrically insulate the electrical components within the component box 106 from the metallic portions of the housing 12, such as the front section 20 and the rear section 22. The component box 106 is received in a cavity 23 in a rear portion of the front section 20, as illustrated in FIGS. 10 and 15. The component box 106 can include apertures 114, a component cavity 116, a first routing cavity 118, a second routing cavity 120, and coupling members 122. The apertures 114 can receive mechanical fasteners, such as screws, bolts, etc. to couple the component box 106 to the field case 21. The component cavity 116 can be generally rectangular, and can have a depth sized to receive and retain the controller 108 and the lighting power supply 110 within the component box 106, as shown in FIG. 17. The first routing cavity 118 and second routing cavity 120 can be sized to enable wires from the wiring harness 112 to be routed away from the metallic portions of the housing 12. The coupling members 122 can retain the controller 108 and the lighting power supply 110 within the component box 106. The coupling members 122 can comprise flexible arms to enable the controller 108 and the lighting power supply 110 to be inserted into the component box 106.

With reference to FIG. 18, the controller 108 can be in communication with and responsive to the trigger 100 and the motor 102 to enable the operation of the portable band saw 10, as will be discussed. The controller 108 can also be in communication with and responsive to the lighting system 18 to activate or deactivate the lighting system 18, as will also be discussed herein. It should be understood that as used herein, the term controller refers to an application specific integrated circuit (ASIC), an electronic circuit, a processor (shared, dedicated, or group) and memory that execute one or more software or firmware programs, a combinational logic circuit, or other suitable components that provide the described functionality. Further, as the controller 108 can be substantially similar to a controller associated with a commercially available Heavy-Duty Deep Cut Variable Speed Band Saw, model D28770, manufactured by DeWALT Industrial Tool Co. of Baltimore, Md., the controller 108 will not be discussed in great detail herein. Briefly, however, the controller 108 can provide a selected current at a selected voltage phase angle to the motor 102 from a field power source (not shown) based on the signal received from the actuator 100a. The controller 108 can also provide current to the lighting system 18 from the lighting power supply 110 based on a signal received from the lighting system 18, as will be discussed.

With reference to FIG. 18, the lighting power supply 110 can comprise any suitable power source capable of providing current to the lighting system 18, such as a battery, capacitor, etc. The lighting power supply 110 can include members 110a to couple the wiring harness 112 to the component box 106. The wiring harness 112 can include apertures formed in a projection 112a that can receive the members 110a to couple the wiring harness 112 to the component box 106. Generally, the wiring harness 112 can be press-fit onto the members 110a.

With reference to FIG. 16, the wiring harness 112 can include one or more controller connections 124, a lighting connection 126, a lighting power supply connection 128 and a feedback coil 130. The controller connections 124, the lighting connection 126, the lighting power supply connection 128 and the feedback coil 130 can be overmolded with a polymeric material to form the wiring harness 112. As the controller connections 124, the lighting connection 126 and the lighting power supply connection 128 can be similar to the connections employed with the commercially available Heavy-Duty Deep Cut Variable Speed Band Saw, model D28770, manufactured by DeWALT Industrial Tool Co. of Baltimore, Md., the controller connections 124, the lighting connection 126 and the lighting power supply connection 128 will not be discussed in great detail herein. The feedback coil 130 can be disposed within a center 132 of the overmolded wiring harness 112, which can be adjacent to the motor 102 when the component box 106 is coupled to the field case 21. The feedback coil 130 can sense the magnetic field generated by the motor 102, and can communicate this information to the controller 108 via an appropriate one of the controller connections 124. Based on the signal from the feedback coil 130, the controller 108 can increase or decrease the speed of the motor 102. By incorporating the feedback coil 130 within the center 132 of the overmolded wiring harness 112, the feedback coil 130 can remain in the same position during the use of the portable band saw 10, which can improve the accuracy of the signal received from the feedback coil 130.

With reference to FIG. 19, the saw blade system 16 can be driven by the motor 102 of the power system 14. The saw blade system 16 can include a blade 200, one or more pulleys 202, a shoe 204, a crash plate system 206 and a sight guide 208. The blade 200 can comprise a conventional band saw blade, such as a Bi-Metal Portable Band Saw Blade, model DW3891, commercially available from DeWALT Industrial Tool Co. of Baltimore, Md. The pulleys 202 can be substantially similar to pulleys associated with the commercially available Heavy-Duty Deep Cut Variable Speed Band Saw, model D28770, manufactured by DeWALT Industrial Tool Co. of Baltimore, Md., and thus, the pulleys 202 will not be discussed in great detail herein. Briefly, however, one of the pulleys 202 can be coupled to the motor 102 to drive the blade 200 around the housing 12.

Figure 20:
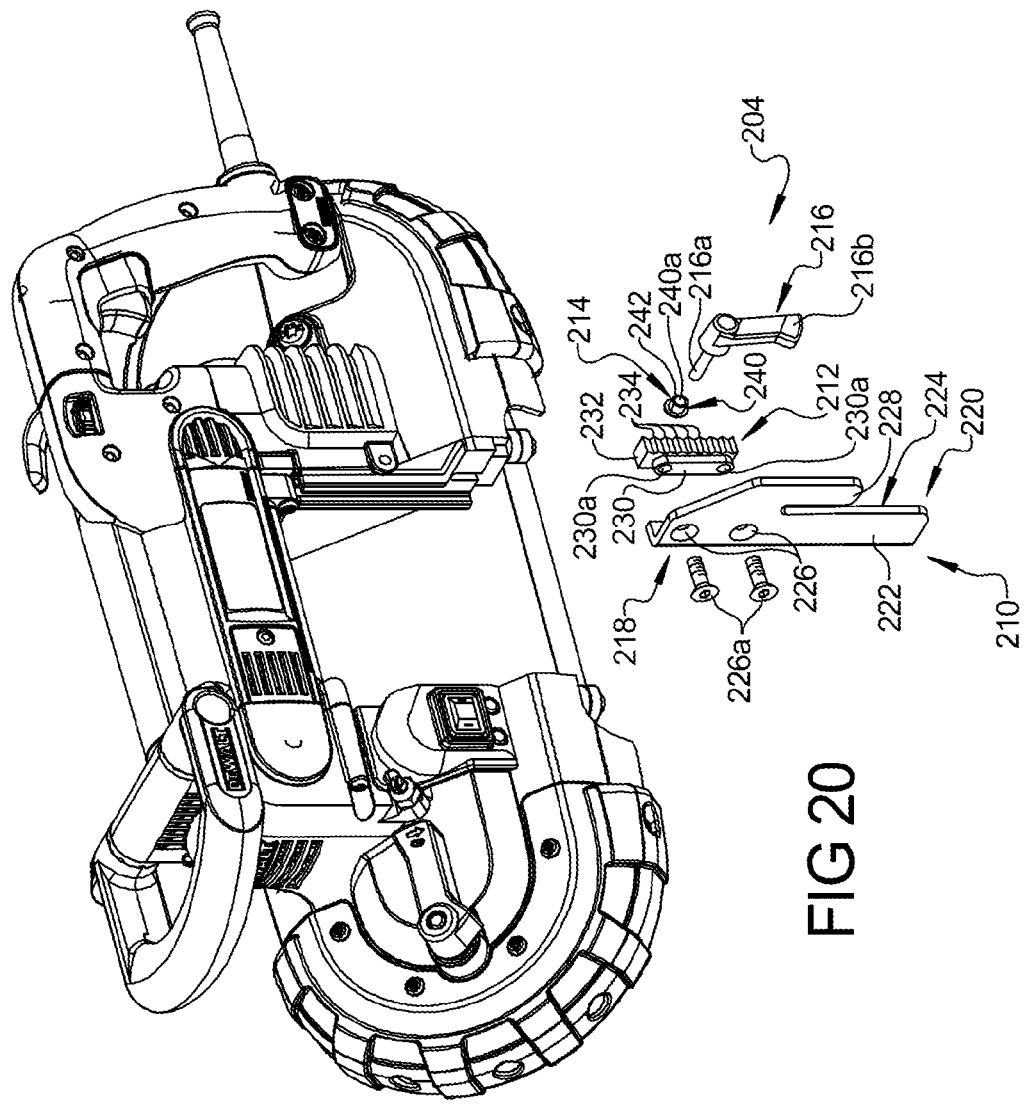
FIG. 20 is a perspective view of the portable band saw shown in FIG. 1 with the adjustable shoe shown in exploded view.
Figure 21:
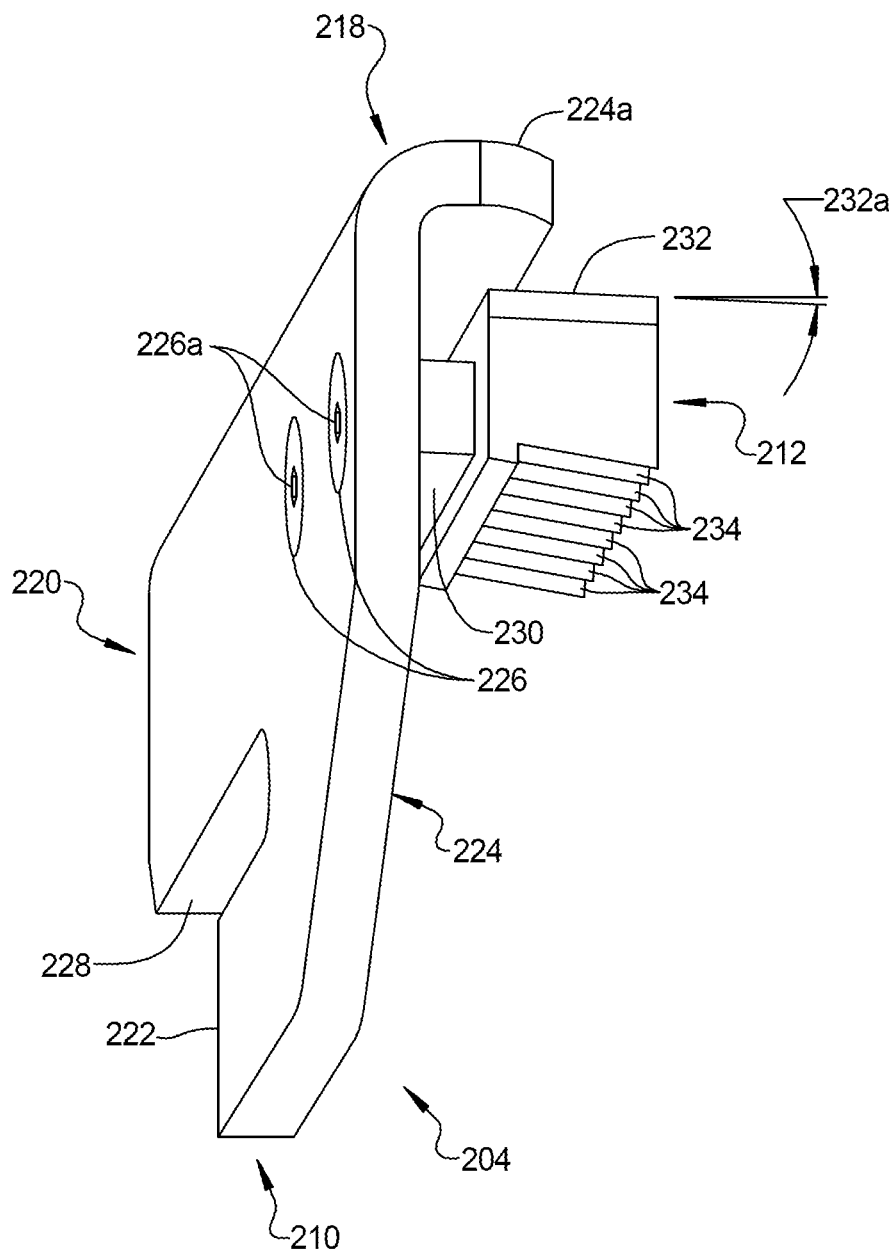
FIG. 21 is a perspective view of the shoe body.
Figure 22:
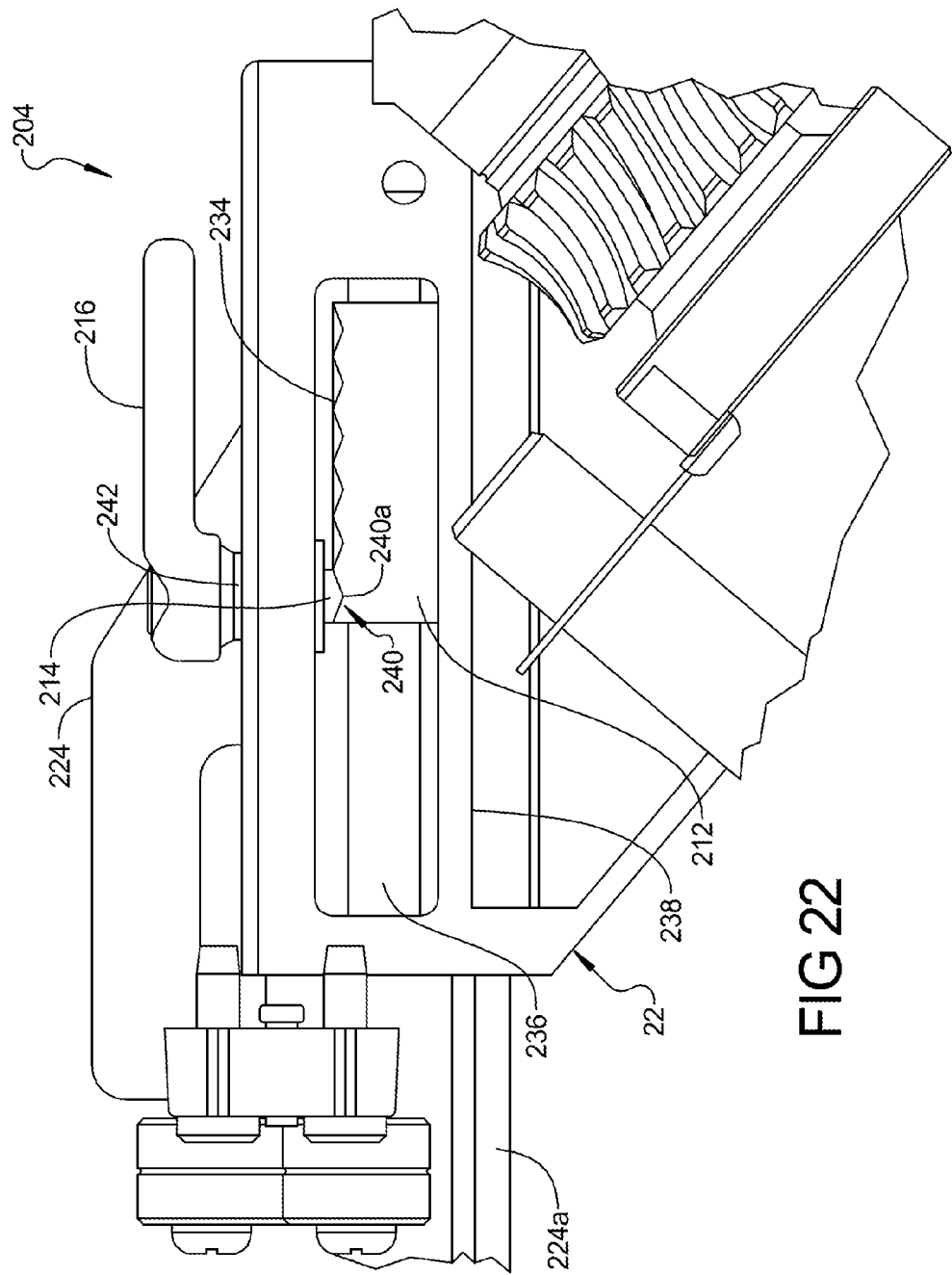
FIG. 22 is partial cut away view illustrating the adjustable shoe according to the principles of the present disclosure.

With reference to FIGS. 20-22, the shoe 204 can be positioned adjacent to the work-piece to support the work-piece during the operation of the portable band saw 10. The shoe 204 can be configured to enable the user of the portable band saw 10 to adjust a position of the shoe 204 relative to the work-piece without requiring tools. The shoe 204 can include a shoe body 210, a block 212, a stud 214 and a lever 216.

With reference to FIGS. 20 and 21, the shoe body 210 can define a first end 218, a second end 220, a first or front side 222 and a second or rear side 224. The first end 218 can include one or more apertures 226 and a blade passage 228. The apertures 226 can be sized to receive one or more mechanical fasteners 226a, such as screws, bolts, etc., to couple the shoe body 210 to the block 212. The blade passage 228 can enable the blade 200 to pass through the shoe body 210. The second end 220 of the shoe body 210 can be positioned adjacent to the work-piece when the shoe 204 is coupled to the housing 12. The front side 222 can face the front section 20 when the shoe 204 is coupled to the rear section 22. The rear side 224 can be opposite the front side 222, and thus, can be adjacent to the rear section 22 when the shoe 204 is coupled to the rear section 22. The rear side 224 can also include a lip 224a (FIG. 21). The lip 224a can cooperate with the block 212 to couple or clamp the shoe body 210 to the rear section 22 of the housing 12.

The block 212 can be coupled to the shoe body 210 via the mechanical fasteners 226a. The block 212 can include a projection 230, a clamping surface 232 and mating features 234. With reference to FIG. 22, the projection 230 can be generally elliptical, and can be sized to slide within a slot 236 formed in the rear section 22 of the housing 12. As will be discussed, the block 212 can cooperate with the slot 236 to enable the shoe body 210 to be positioned and secured in any desired position along a length of the slot 236. The slot 236 can comprise a T-slot to enable only the projection 230 of the block 212 to be received in and slide within the slot 236. As shown in FIG. 20, the projection 230 can define apertures 230a for receipt of the mechanical fasteners 226a to couple the block 212 to the shoe body 210, and thus, the apertures 230a can be threaded, if necessary, to mate with the mechanical fasteners 226a.

With reference to FIGS. 20 and 22, the clamping surface 232 can cooperate with the lip 224a to couple or clamp the shoe 204 to the rear section 22 of the housing 12. In this regard, the rear section 22 of the housing 12 can include a rail 238 adjacent to the slot 236 (FIG. 22). When the projection 230 is positioned within the slot 236, the lip 224a can abut against a first side of the rail 238 and the clamping surface 232 can abut against a second side of the rail 238 to clamp the shoe 204 to the housing 12. With reference to FIG. 21, the clamping surface 232 can include a taper 232a. The taper 232a can enable the block 212 to be forced tightly against the rail 238 to firmly clamp the shoe body 210 to the housing 12.

With reference to FIGS. 20-22, the mating features 234 can be defined on a surface opposite the clamping surface 232. The mating features 234 can include any feature capable of engaging the stud 214 in a variety of positions, such as ridges, angled projections, detents, etc. The mating features 234 can engage the stud 214 such that a force applied to the stud 214, via the lever 216, can be applied to the block 212 to clamp the shoe 204 to the housing 12. Thus, the mating features 234 can cooperate with the stud 214 to lock or secure the shoe 204 in a desired vertical position relative to the housing 12.

With reference to FIGS. 20 and 22, the stud 214 can include a first end 240 and a second end 242. The first end 240 of the stud 214 can include at least one mating feature 240a. The mating feature 240a can be configured to engage the mating features 234 on the block 212 to transmit a torque from the lever 216 to the block 212 to clamp the shoe 204 to the housing 12. For example, if the mating features 234 of the block 212 comprise angled projections, then the mating feature 240a of the stud 214 can comprise a valley. The second end 242 of the stud 214 can be configured to couple the lever 216 to the stud 214, and thus, the second end 242 can define a bore that can be threaded, keyed, notched, etc. to couple the lever 216 to the stud 214.

With reference to FIGS. 20 and 22, the lever 216 can include a first end 216a that can couple the lever 216 to the stud 214, and a second end 216b that can receive an input from the user of the portable band saw 10. The first end 216a can be configured to mate within the bore 242a of the second end 242 of the stud 214, and thus, the first end 216a can be threaded, keyed, notched, etc. to fixedly couple the lever 216 to the stud 214. In addition, it should be understood that although the stud 214 and lever 216 are described herein as being discrete elements, the stud 214 and lever 216 could also be integrally formed. The second end 216b of the lever 216 can be sized such that the user can easily grasp the lever 216 to rotate the lever 216 clockwise or counterclockwise relative to the housing 12. In this regard, the lever 216 can be rotated clockwise to apply the torque to the block 212, via the stud 214, to clamp the shoe 204 in a desired position relative to the housing 12. The lever 216 can be rotated counterclockwise to release the torque from the block 212, by disengaging the mating features 234 of the block 212 from the mating feature 240a of the stud 214, to enable the projection 230 of the block 212 to be slid into a desired position within the slot 236. Thus, the lever 216 can enable tool-less adjustment of the shoe 204 relative to the housing 12, which can enable quick adjustments of the shoe 204 on a job site.

Figure 25:
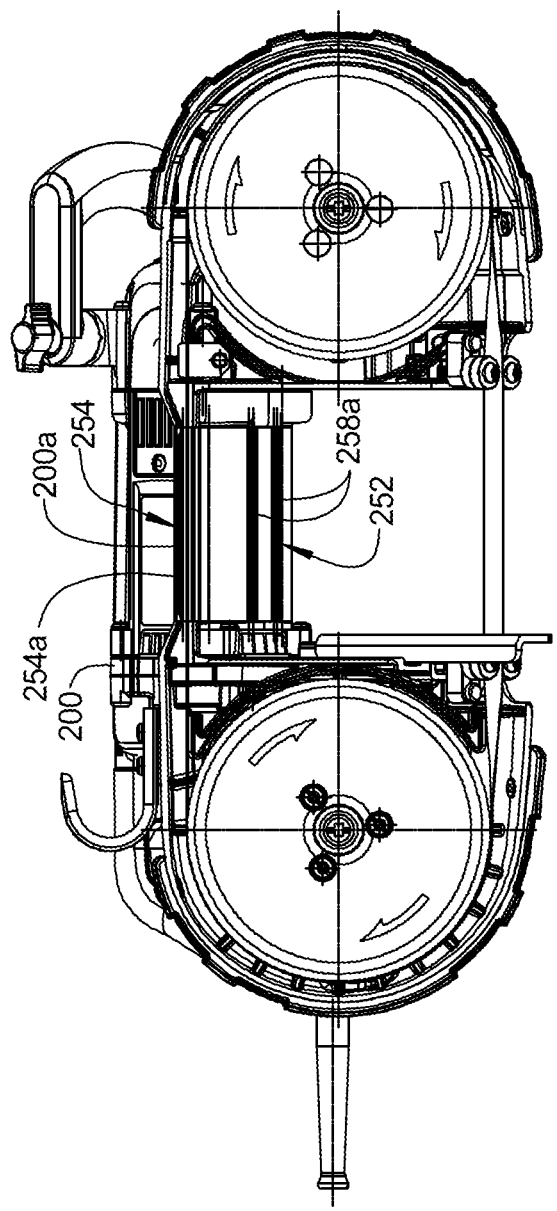
FIG. 25 is a rear perspective view of the crash guard mounted to the field case and receiving the blade in a rear blade guard portion according to the principles of the present disclosure.

With reference to FIGS. 19 and 23-25, the saw blade system 16 can also include the crash plate system 206. The crash plate system 206 can protect a bottom 250 of the field case 21 from damage that may be caused by the portable band saw 10 contacting the work-piece after the cutting operation due to the inherent follow through motion of the portable band saw 10. The crash plate system 206 can include a crash plate 252 and a blade guard 254. The crash plate 252 and blade guard 254 can be discrete members, or can be integrally formed into a monolithic member. The crash plate 252 and blade guard 254 can be composed of any suitable high strength material, such as a metal, metal alloy or resilient polymer. The crash plate 252 can protect the field case 21 from damage, while the blade guard 254 can protect the user from a rear section 200a of the blade 200 (FIG. 25).

The crash plate 252 can be configured to mate with the bottom 250 of the field case 21, and for example, can be generally concave in shape. As shown in FIG. 24, the crash plate 252 can also be sized to fit in the void defined between the first bore 21a and second bore 21b of the field case 21, so that the compression rods 24a, 24b can be used to couple the crash plate 252 to the field case 21. It will be understood that any suitable technique could be used to couple the crash plate 252 to the field case 21, such as welding, adhesives, mechanical fasteners, etc. The crash plate 252 can include a top surface 256, a rear surface 258, a first side 260, a second side 262 and throughbores 264.

With reference to FIGS. 23 and 24, the top surface 256 can be positioned adjacent to the field case 21, and can be generally smooth to mate with a generally smooth exterior of the field case 21. The rear surface 258 can be opposite the top surface 256, and can include one or more crush ribs 258a. The crush ribs 258a can absorb and distribute forces incurred when the portable band saw 10 inadvertently contacts the work-piece. The first side 260 can be coupled to the sight guide 208, and the second side 262 can be coupled to the blade guard 254. The throughbores 264 can be sized to slideably receive the compression rods 24 therethrough to couple the crash plate 252 to the field case 21 (FIG. 23).

With reference to FIGS. 19 and 23-25, the blade guard 254 can be coupled to or formed on the second side 262 of the crash plate 252. As discussed, the blade guard 254 can protect or guard the user from the rear portion 200a of the blade 200 (FIG. 25), and can also shield the blade 200 from debris or objects adjacent to the work-piece. The blade guard 254 can define a passage 254a. The passage 254a can be sized to enable the blade 200 to pass therethrough, and can generally have a depth configured such that a majority of the blade 200 is disposed within the passage 254a.

Figure 26:
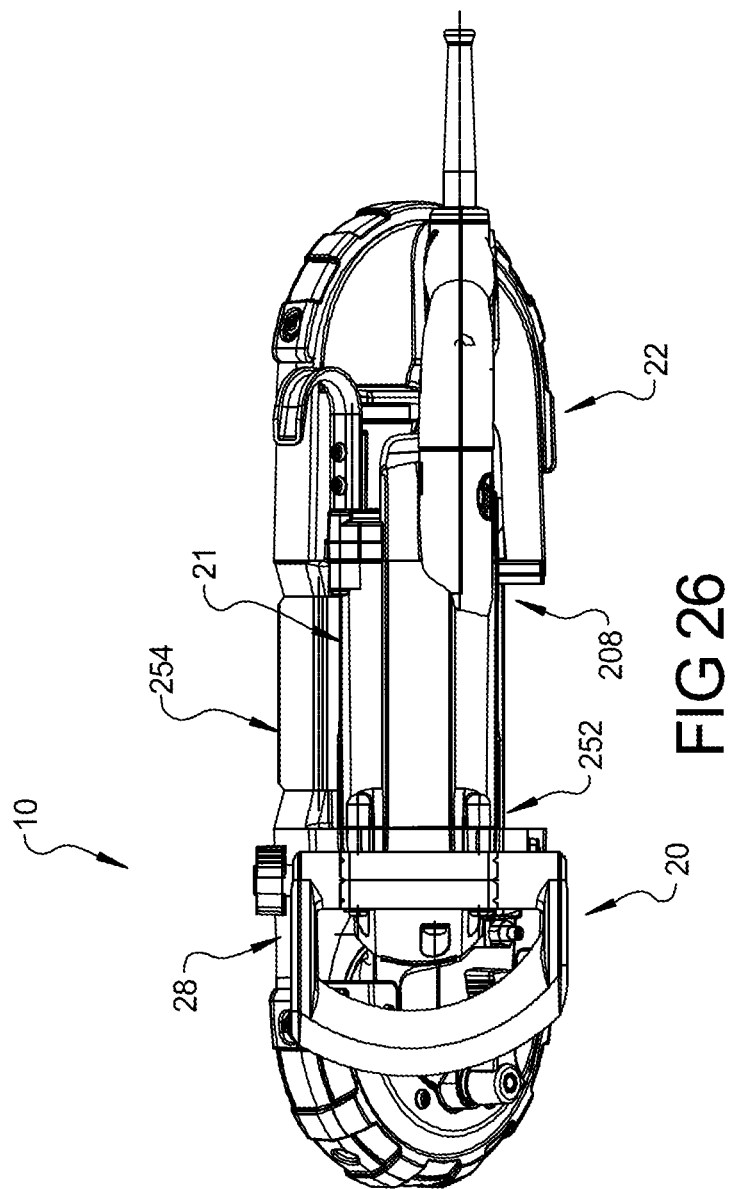
FIG. 26 is top view of the field case illustrating the sight guide according to the principles of the present disclosure.

With reference to FIGS. 24 and 26, the sight guide 208 can be coupled to the first side 260 of the crash plate 252 (FIG. 24). In this regard, the sight guide 208 can be coupled to the first side 260 such that the sight guide 208 can extend substantially an entire length of the first side 260 of the crash plate 252. The sight guide 208 can be comprised of any suitable material, such as a metal, metal alloy or polymer, that can be coated with a color, which contrasts with the field case 21, such as red, to enable the user to easily view the sight guide 208. The sight guide 208 can be coupled to the crash plate 252 via any suitable technique, such as molding, adhesives, mechanical fasteners, etc. For example, the sight guide 208 can comprise a polymeric material that can be adhesively coupled to the crash plate 252, or the sight guide 208 can comprise a polymeric coating, such as paint, that can be applied to the first side 260 of the crash plate 252. The sight guide 208 can assist the user in predicting the cutting plane of the blade 200, without reducing or altering the blade 200. In use, the user can align the sight guide 208 with a line or scribe on the work-piece and maintain this alignment throughout the cutting operation, which can assist the user in producing accurate cuts.

Figure 27:
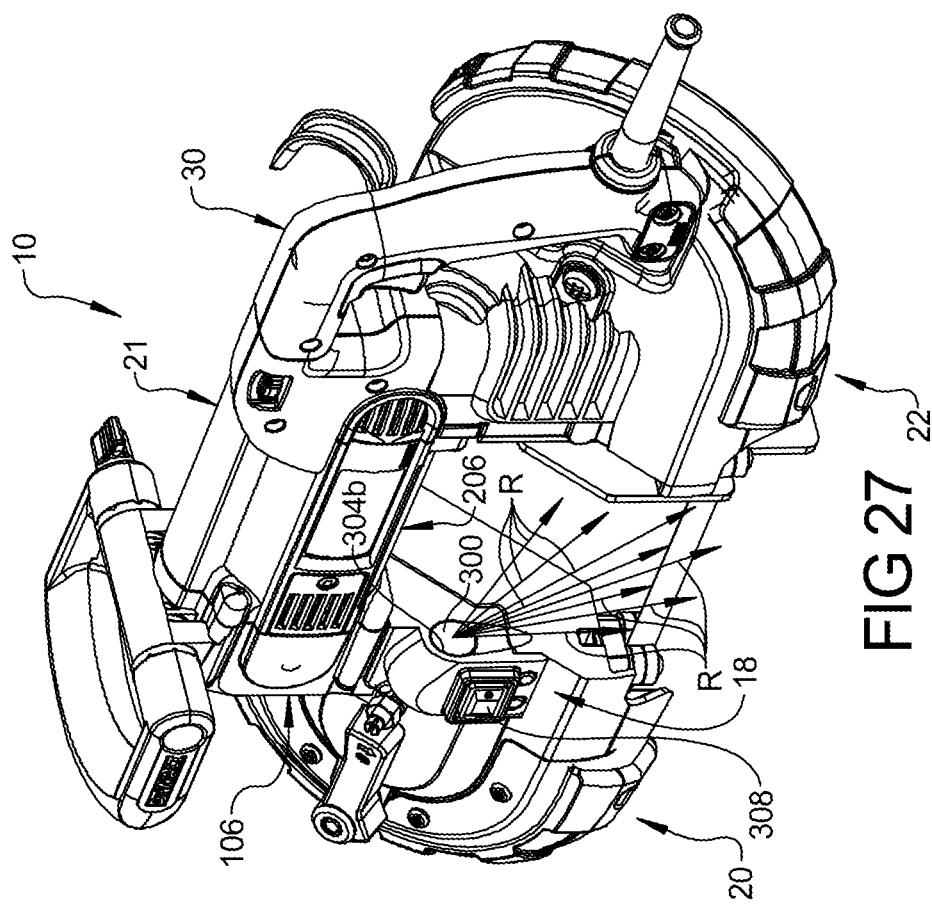
FIG. 27 is a perspective view of a portable band saw illustrating the light system according to the principles of the present disclosure.
Figure 28:
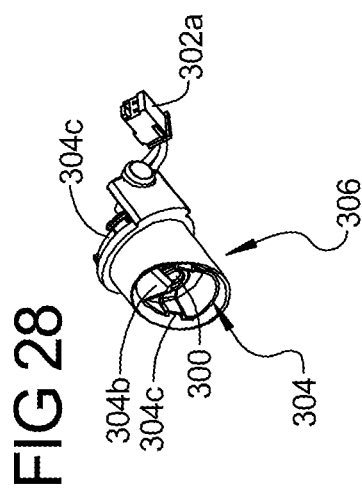
FIG. 28 is perspective view of the light assembly according to the principles of the present disclosure.
Figure 29:
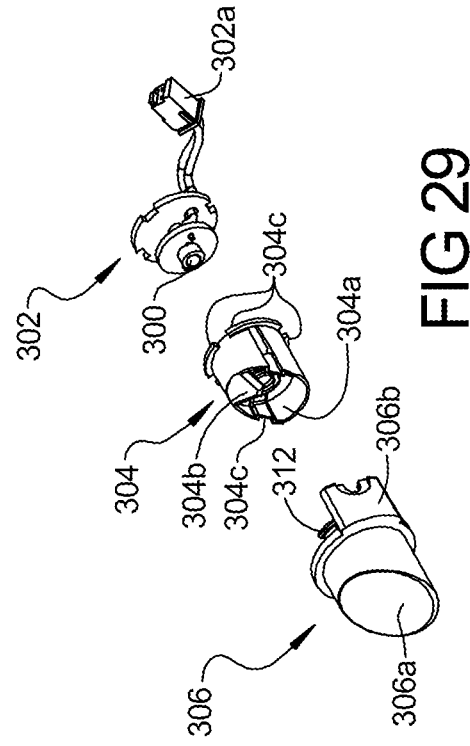
FIG. 29 is an exploded perspective view of the light assembly according to the principles of the present disclosure.

With reference to FIGS. 27-29, the lighting system 18 can illuminate the work-piece, generally in an area adjacent to and encompassing the desired cutting area or cutting path through the work-piece. The lighting system 18 can be housed within the component box 106 of the control system 104 on the front section 20 of the housing 12. The lighting system 18 can include a light source 300 (FIG. 29), a printed circuit board (PCB) 302 (FIG. 29), a baffle 304 (FIGS. 28 and 29), a housing 306 (FIGS. 28 and 29) and a switch 308 (FIG. 27).

With reference to FIGS. 27 and 29, the light source 300 can comprise any suitable light emitting device, such a light emitting diode (LED), organic light emitting diode (OLED), etc. If a LED is employed as the light source 300, the LED can comprise a one-half watt LED. The light source 300 can emit light rays R onto the work-piece to aid the user in the cutting operation. The light source 300 can be coupled to the PCB 302.

With reference to FIG. 29, the PCB 302 can be in communication with and responsive to the controller 104, via a connector 302a, to receive power or current from the lighting power supply 110. The PCB 302 can include suitable circuitry to power the light source 300 with the power received from the lighting power supply 110. Upon receipt of the current from the controller 104, the PCB 302 can activate the light source 300 to illuminate the work-piece.

With reference to FIGS. 28 and 29, the baffle 304 can be positioned over the light source 300 and the PCB 302. The baffle 304 can be generally annular, and can be sized to surround the light source 300 and the PCB 302 such that the PCB 302 is hidden from the view of the user. The baffle 304 can be composed of any suitable heat resistant material, such as a metal, metal alloy or polymer. The baffle 304 can include a bore 304a, a shade 304b and keys 304c. The bore 304a can be sized to enable the light source 300 and the PCB 302 to be retained within the baffle 304. The shade 304b can be generally V-shaped, and can cover at least a portion of the light source 300. The shade 304b can prevent the light rays from the light source 300 from shining in the user's eyes. The keys 304c can ensure that the baffle 304 is properly inserted within the housing 306, and that the baffle 304 does not rotate relative to the housing 306.

The housing 306 can couple the lighting system 18 to the component box 106. The housing 306 can be composed of any suitable material, such as a metal, metal alloy or polymer, and can generally comprise a translucent polymer. The housing 306 can include a bore 306a and at least one coupling feature 306b. The bore 306a can be configured to receive the baffle 304, and can include mating keys 312. The mating keys 312 can engage the keys 304c of the baffle 304, which can ensure that the baffle 304 is properly orientated and remains properly orientated within the housing 306. The coupling feature 306b can couple the housing 306 to the component box 106. For example, the coupling feature 306b can comprise a bore for receipt of a mechanical fastener, such as a screw, bolt, etc. to couple the housing 306 to the component box 106, as shown in FIG. 15.

With reference to FIGS. 15 and 27, the switch 308 can also be coupled to the component box 106, and can be in communication with the controller 108. The switch 308 can be coupled to the component box 106 such that the switch 308 can be easily manipulated by the user. In this regard, the switch 308 can enable the user to activate or deactivate the light source 300. Thus, based on the user input received, the switch 308 can transmit a signal to the controller 108, which can then transmit or cease transmitting power to the PCB 302, effectively activating or deactivating the light source 300.

In order to assemble the lighting system 18, the light source 300 can be coupled to the PCB 302, and that assembly can be inserted into the baffle 304. Then, the baffle 304 can be inserted into the housing 306, which can then be coupled to the component box 106. The user can then manipulate the switch 308 to activate or deactivate the light source 300. Thus, the lighting system 18 can be easily assembled and coupled to the portable band saw 10 to enable a user to selectively illuminate the work-piece, while not projecting light rays into the user's eyes.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A portable band saw, comprising:
a housing including a front section and a rear section;
a blade extending between said front section and said rear section;
a field case disposed between said front section and said rear section,
an electric box assembly including a plastic component box disposed forward of the field case and within a cavity of said front section, said plastic component box including a component cavity housing a control module and a light power supply therein and a wire harness extending therefrom for connection with said field case.

2. A portable band saw, comprising:
a housing including a front section and a rear section;
a blade extending between said front section and said rear section;
a field case disposed between said front section and said rear section,
an electric box assembly including a plastic component box disposed between said field case and said front section, said electric box assembly including a component cavity housing a control module and a light power supply therein and a wire harness extending therefrom for connection with said field case; and
wherein said plastic component box includes a first routing cavity extending from said component cavity and receiving a first wire from said wire harness.

3. The portable band saw according to claim 2, wherein said plastic component box includes a second routing cavity extending from said component cavity and receiving a second wire from said wire harness.

4. The portable band saw according to claim 3, wherein said wire harness includes a controller connection, a light source connection, a light power supply connection and a feedback coil.

5. The portable band saw according to claim 4, wherein said feedback coil is adjacent to a motor in said field case for sensing a magnetic field generated by the motor and communicating this information to the control module via the controller connection.

6. The portable band saw according to claim 3, further comprising a light source and light source mounted to said second routing cavity.

7. A portable band saw, comprising:
a housing including a front section and a rear section;
a blade extending between said front section and said rear section;
a field case disposed between said front section and said rear section,
an electric box assembly including a plastic component box disposed forward of the field case and within a cavity of said front section, said plastic component box including a component cavity housing a control module and a light power supply therein and a wire harness extending therefrom for connection with a light source and power switch, said plastic component box includes a first routing cavity extending from said component cavity and receiving a first wire from said wire harness, said light source mounted to said second routing cavity.

8. The portable band saw according to claim 7, wherein said light source is a light emitting diode that is connected to a printed circuit board, said light emitting diode and said printed circuit board being received in a cavity of a baffle which is received in a light housing that is mounted to said first routing cavity.

9. A portable band saw, comprising:
a housing including a front section and a rear section;
a blade extending between said front section and said rear section;
a field case disposed between said front section and said rear section,
an electric box assembly including a plastic component box disposed forward of the field case and within a cavity of said front section, said plastic component box including a component cavity housing a control module and a light power supply therein and a wire harness extending therefrom for connection with a light source and power switch, said plastic component box includes a first routing cavity extending from said component cavity and receiving a first wire from said wire harness, said light source mounted to said second routing cavity;
wherein said light source is a light emitting diode that is connected to a printed circuit board, said light emitting diode and said printed circuit board being received in a cavity of a baffle which is received in a light housing that is mounted to said first routing cavity; and wherein said light housing includes a V-shaped shade portion covering a portion of the light emitting diode to prevent light from shining directly in the user's eyes.

* * * * *